United States Patent
Ishii et al.

(10) Patent No.: US 8,099,102 B2
(45) Date of Patent: Jan. 17, 2012

(54) CALL ADMISSION CONTROL DEVICE AND CALL ADMISSION CONTROL METHOD

(75) Inventors: Hiroyuki Ishii, Yokosuka (JP); Akihito Hanaki, Yokohama (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 761 days.

(21) Appl. No.: 11/605,420

(22) Filed: Nov. 29, 2006

(65) Prior Publication Data

US 2007/0265017 A1 Nov. 15, 2007

(30) Foreign Application Priority Data

Nov. 30, 2005 (JP) ................................. 2005-346319

(51) Int. Cl.
*H04Q 5/20* (2006.01)
(52) U.S. Cl. .................. 455/453; 455/452.1; 455/435.1
(58) Field of Classification Search .................. 455/453, 455/452.1, 452, 1, 2, 424, 435.1
See application file for complete search history.

(56) References Cited

U.S. PATENT DOCUMENTS

| | | | |
|---|---|---|---|
| 2002/0183039 A1* | 12/2002 | Padgett et al. ................ | 455/406 |
| 2003/0210660 A1 | 11/2003 | Wiberg et al. | |
| 2004/0082363 A1* | 4/2004 | Hosein .......................... | 455/560 |
| 2006/0056451 A1* | 3/2006 | Yano et al. .................... | 370/468 |
| 2007/0026808 A1* | 2/2007 | Love et al. ................... | 455/67.7 |

FOREIGN PATENT DOCUMENTS

| | | |
|---|---|---|
| CN | 1674544 A | 9/2005 |
| EP | 1 033 849 A1 | 9/2000 |
| EP | 1 100 283 A1 | 5/2001 |
| EP | 1 126 734 A1 | 8/2001 |
| EP | 1 189 472 A1 | 3/2002 |
| EP | 1 227 695 A1 | 7/2002 |
| JP | 2002-217956 A | 8/2002 |
| JP | 2002-223239 A | 8/2002 |
| JP | 2002-232941 A | 8/2002 |
| JP | 2006-130053 A | 5/2005 |
| JP | 2005-525743 A | 8/2005 |
| WO | WO 02/067619 A2 | 8/2002 |
| WO | WO-03/096571 A1 | 11/2003 |

OTHER PUBLICATIONS

Klaus I. Pedersen, "Quality Based HSDPA Access Algorithms", Vehicular Technology Conference, 2005, pp. 2498-2502, XP010878903, IEEE 62ND, Dallas, Texas.
Troels Emil Kolding, et al., "High Speed Downlink Packet Access: WCDMA Evolution", IEEE Vehicular Technology Society News, Feb. 1, 2003, pp. 4-10, XP002307537.

(Continued)

*Primary Examiner* — Charles Appiah
*Assistant Examiner* — William F Rideout
(74) *Attorney, Agent, or Firm* — Crowell & Moring LLP

(57) ABSTRACT

A call admission control device efficiently controls admission of a new call. In a scheduling operation, a congestion state in a cell is estimated based on the number or ratio of the mobile stations whose average transmission data rates have been initialized, and call admission control is performed, thereby appropriately performing the call admission control regardless of the occurrence of traffic or a mode of a cell.

12 Claims, 17 Drawing Sheets

OTHER PUBLICATIONS

Zbigniew Dziong, et al, "Adaptive Traffic Admission for Integrated Services in CDMA Wireless-Access Networks", IEEE Journal on Selected Areas in Communications, IEEE Service Center, Dec. 1, 1996, vol. 14, No. 9, XP011054571, Piscataway, U.S., pp. 1737-1747.

Yoshihiro Ishikawa, et al., "Capacity Design and Performance of Call Admission Control in Cellular CDMA Systems", IEEE Journal on Selected Areas in Communications, IEEE Service Center, Oct. 1, 1997, vol. 15, No. 8, XP011054711, Piscataway, U.S., pp. 1627-1635.

3GPP TR 25.848 v4.0.0(Mar. 2001), $3^{rd}$ Generation Partnership Project; Technical Specification Group Radio Access Network; Physical layer aspects of UTRA High Speed Downlink Packet Access (Release 4) http://www.3gpp.org.

3GPP2 C. S0024-A Version 1.0., Mar. 2004, "cdma2000 High Rate Packet Data Air Interface Specification", http://www.3gpp2.org/Public_html/specs/tsgc.cfm.

* cited by examiner

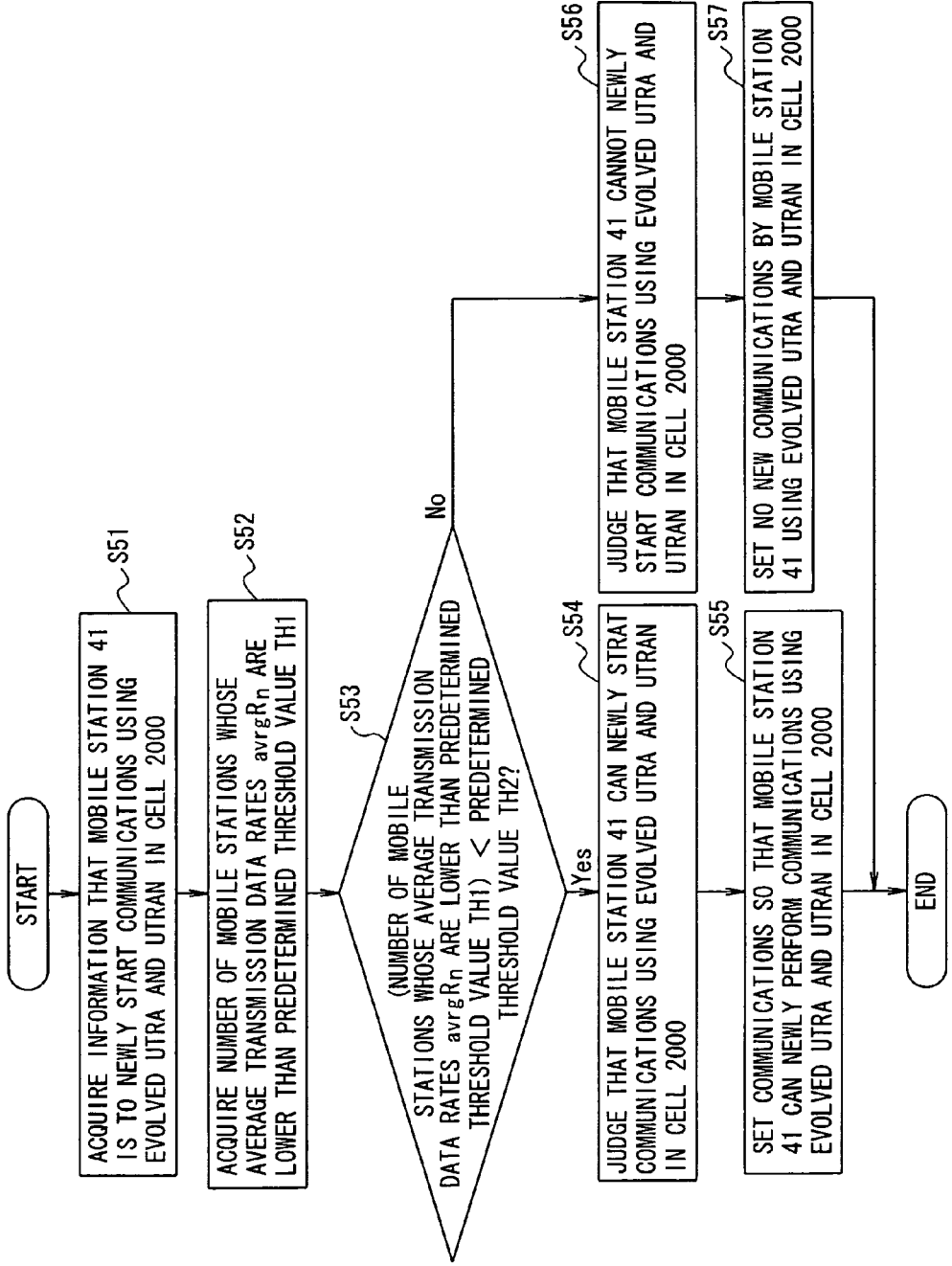

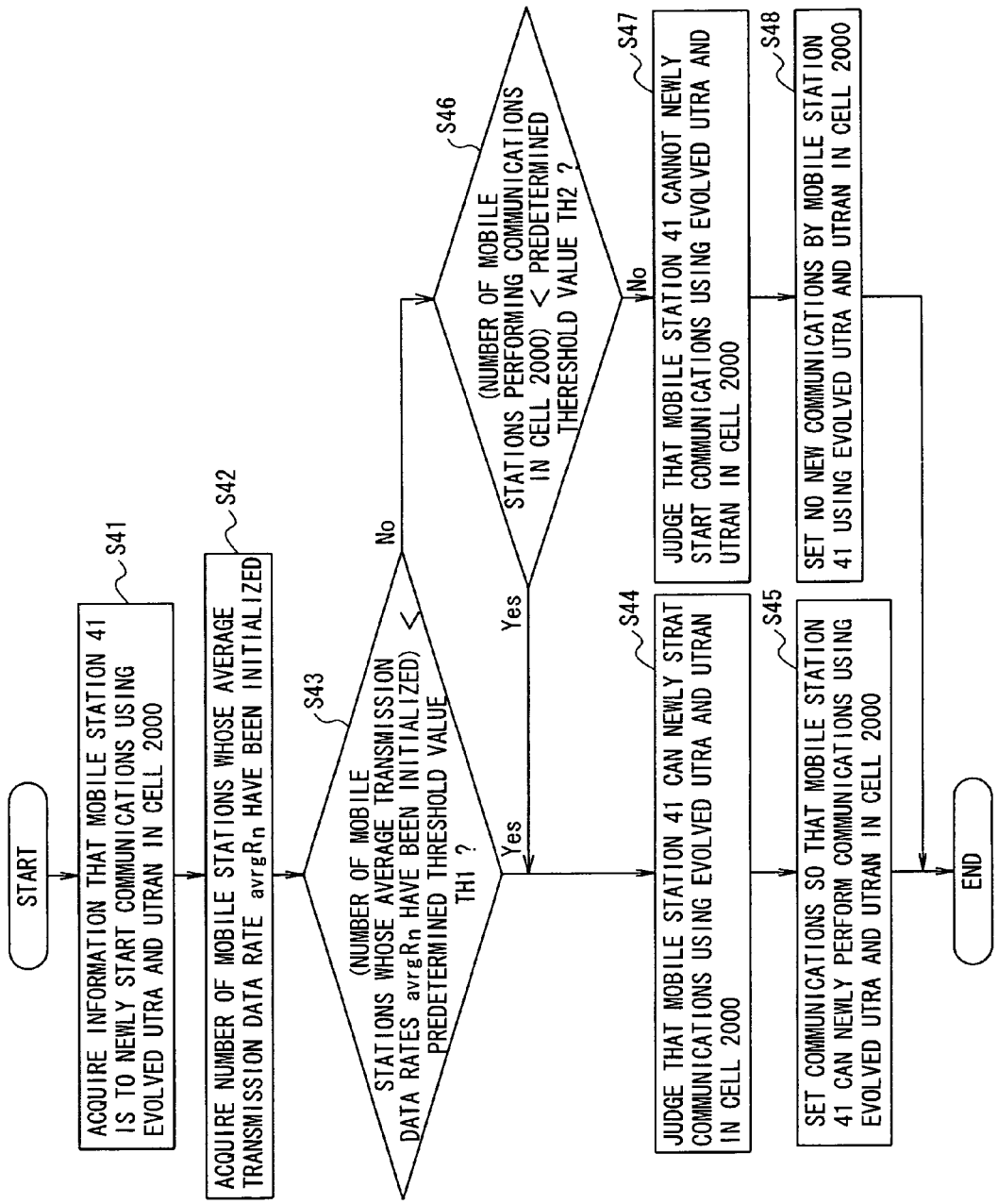

CALL ADMISSION CONTROL DEVICE AND CALL ADMISSION CONTROL METHOD

BACKGROUND OF THE INVENTION

1. Field of the Invention

The present invention relates to a call admission control device and call admission control method, and more specifically to a call admission control device and call admission control method for controlling the admission of a call in a packet communication system in mobile communications.

2. Description of the Related Art

A mobile communication system performs a communication using finite resources (frequencies and power). There is an upper limit to the communication capacity. Therefore, it is necessary to limit the number of mobile stations in a cell depending on the communication capacity. Practically, when a new mobile station starts communications in the cell, it is necessary to judge whether or not the new mobile station can start a communication in the cell. The control is referred to as call admission control. The status in which a new mobile station cannot start a communication in the cell, that is, the status in which the communication capacity is being used substantially 100%, is referred to as a capacity limit.

The conventional call admission control is a control method of, for example, allowing a new mobile station to start communications when the total number of mobile stations being communicating in the cell does not exceed a predetermined threshold value, and not allowing a new mobile station to start communications when the total number of mobile stations being communicating in the cell exceeds the predetermined threshold value.

Relating to the standardization of a third generation mobile communication system, what is called IMT (International Mobile Telecommunications)-2000, the standard specifications related to the W-CDMA-system and the cdma 2000 system are prescribed respectively for the 3GPP (Third-Generation Partnership Project) and 3GPP2 (Third-Generation Partnership Project 2).

In the 3GPP, with the recent fast spread of the Internet, based on the prediction that high speed and large capacitance traffic by the download, etc. from a database and a Web site especially in the downlink, the specification of the "HSDPA (High Speed Downlink Packet Access)" as a high speed packet transmission system in the downlink direction is prescribed (for example, refer to "3GPP TR25.848 v4.0.0"). As for the 3GPP2, from a similar point of view, the specification of the "1xEV-DO" as a high speed dedicated transmission system in the downlink direction is prescribed (for example, refer to "3GPP2 C.S0024 Rev.1.0.0"). In the CDMA 2000 1xEV-DO, the DO means "Data only".

Further described below is the HSDPA.

The HSDPA is a system for performing communications by sharing one shared channel or more than two channels among a plurality of mobile stations, and a radio base station selects a mobile station which uses the shared channel from among the plurality of mobile stations for each TTI (Time Transmission Interval, 2 ms for the HSDPA) for transmission of a packet. In this case, depending on the occurrence of data traffic, there is a difference in number of mobile stations in a cell when a capacity limit is reached. For example, when the case where all mobile stations download data using an FTP (File Transfer Protocol) is compared with the case where all mobile stations perform Web browsing, the number of mobile stations in the cell when the capacity limit is reached is larger in the latter case because there are all the time packets to be transmitted to the mobile stations in downloading data using the FTP, while, in the case of the Web browsing, a user has reading time to browse Web pages and there is time when no packet to be transmitted to a mobile station exists. That is, in the case of the Web browsing, since there is a low frequency at which one mobile station uses a shared channel, more mobile stations can share one shared channel. As a result, in the HSDPA, the number of mobile stations that can be accumulated in a capacity limit fluctuates depending on the occurrence of data traffic.

In the HSDPA, a modulation system of a radio channel and a system of controlling a coding rate (in the HSDPA, it is called an AMCS (adaptive modulation and coding scheme)) are adopted depending on the radio channel quality between a mobile station and a radio base station, and the transmission data rate fluctuates depending on the radio channel quality (for example, signal-to-interference power ratio (SIR)) between the mobile station and the radio base station. On the other hand, the radio channel quality (SIR) largely depends on the mode of a cell such as an outdoor environment and an indoor environment, an urban area and a suburb, etc. That is, in the HSDPA, the number of mobile stations that can be accumulated at the capacity limit fluctuates depending also on the mode of a cell.

In such HSDPA, when the call admission control in the above-mentioned conventional method, that is, the call admission control based on the number of mobile stations currently performing communications in a cell, is performed, the number of mobile stations performing communications in the cell in a capacity limit is constant. Therefore, the transmission data rate of each mobile station in a capacity limit depends on the position of each mobile station or the mode in a cell. For example, since there is little interference from another cell in an indoor environment, and the radio channel quality is high, the transmission data rate of each mobile station in a capacity limit is high. However, since there is much interference in an outdoor environment, and the radio channel quality is not high, it is considered that the transmission data rate of each mobile station in a capacity limit is low.

However, the transmission data rate of each mobile station in a capacity limit is to be determined by the serviceability of the communications provided using the HSDPA, and it is desired that the speed is constant regardless of the mode of a cell or the position of each mobile station.

Described below is the scheduling in the HSDPA. As described above, the HSDPA is a system for performing communications by sharing one channel or more than two channels to be shared among a plurality of mobile stations, a radio base station selects a mobile station that uses the shared channel from among the plurality of mobile stations for each TTI (Time Transmission Interval, 2 ms in the HSDPA), and transmits a packet. Selecting a mobile station that uses the shared channel for each TTI by a radio base station is referred to as scheduling.

An well known algorithm of the scheduling is a round robin scheduler for controlling the transmission order of a transmission allocation packet of a downlink shared channel in order (for example, the mobile station #1→#2→#3→ . . . ) on the mobile station which are connected to a radio base station device. Furthermore, a Proportional Fairness scheduler and a MAX C/I (Maximum C/I) scheduler for controlling the transmission order of a packet waiting for transmission based on a radio channel quality of each mobile station and an average transmission data rate of each mobile station are also well known.

For example, the Proportional Fairness scheduler performs scheduling by calculating the evaluation function $Cn=Rn/avrgRn$ relating to each mobile station, and allocating a packet to a mobile station having the largest evaluation function Cn. Rn indicates a momentary radio channel quality of each mobile station, and avrgRn indicates an average transmission data rate of each mobile station.

The Proportional Fairness scheduler can be expected to obtain higher throughput than the round robin scheduler because transmission allocation is performed in a state in which downlink radio channel quality is relatively good in each mobile station. Then, the value of the evaluation function expression of a mobile station having a high average transmission data rate is reduced by performing a division by an average transmission data rate of each mobile station, thereby realizing allocation with high fairness in time.

Furthermore, from a view point of serviceability, a method of providing Proportional Fairness scheduling with the minimum transmission data rate taken into account is proposed by, for example, JP2005-130053A. In JP2005-130053A, it is proposed that $Cn=Rn/(avrgRn-_{target}R)$ is to be used instead of $Cn=Rn/avrgRn$ as an evaluation function Cn. In the equation, $_{target}R$ indicates the minimum transmission data rate.

In the 3GPP, the specification of the Evolved UTRA and UTRAN (also referred to as Long Term Evolution or Super 3G) as a further high-speed packet communication system is defined. However, the Evolved UTRA and UTRAN (also referred to as Long Term Evolution or Super 3G) has almost the same characteristics, that is, using a shared channel, performing the AMC, performing scheduling about the allocation of the shared channel, etc., as the above-mentioned HSDPA.

In JP2002-232941A, the amount of uplink interference and the total downlink transmission power when a call is admitted are estimated, and it is determined whether or not the estimated amount of uplink interference is equal to or higher than a threshold value of an amount of interference, whether or not the total downlink transmission power is equal to or higher than a transmission power threshold value, and whether or not the remaining and unused expansion code resources are equal to or lower than an expansion code threshold value. Depending on the determination result, it is controlled whether or not a call admission request is to be recognized.

In JP2002-223239A, depending on the type of service or the priority, the admission of a new call is controlled.

JP2002-217956A controls the admission of a new call depending on the resource use status and the number of packet users.

As described above, there is a method of not admitting a call of a new mobile station when a total number of mobile stations performing communications in a corresponding cell exceeds a predetermined threshold value as a call admission control method in a communication system which transmits a packet to a plurality of mobile stations.

However, the above-mentioned conventional call admission control method has the disadvantage of not able to appropriately controlling admission of a call depending on the method of generating packet data and the mode of a cell. That is, when the conventional call admission control method is used, there occurs the problem that the transmission data rate of a mobile station in a capacity limit depends on the method of generating packet data and the mode of a cell.

SUMMARY OF THE INVENTION

The present invention has been developed to solve the above-mentioned problems of the conventional technology, and the advantage of the present invention is to provide a call admission control device and call admission control method capable of adaptively controlling call admission on the method of generating packet data and the mode of a cell, and efficiently admitting a new call.

The call admission control device according to claim 1 of the present invention is a call admission control device in a communication system for transmitting a packet to a plurality of mobile stations. The device controls call admission of a new mobile station based on at least one of the number and the ratio of mobile stations that cannot satisfy a predetermined minimum transmission data rate in the plurality of mobile stations. By controlling call admission by estimating the congestion status in a cell based on at least one of the number and the ratio of the mobile stations that cannot satisfy the predetermined minimum transmission data rate in the plurality of mobile stations, the call admission can be appropriately controlled regardless of the occurrence of traffic and the mode of a cell.

The call admission control device according to claim 2 of the present invention is a call admission control device in a communication system for transmitting a packet to a plurality of mobile stations. The device includes:

transmission data rate grasp means for measuring the average transmission data rate of the mobile station;

minimum transmission data rate setting means for setting the value of a minimum transmission data rate;

judge means for judging whether or not the value of the average transmission data rate of the mobile stations is lower than the value of the minimum transmission data rate; and new mobile station admission means for controlling the call admission of a new mobile station based on at least one of the number and the ratio of the mobile stations on which it is judged that the value of the average transmission data rate is lower than the value of the minimum transmission data rate. By controlling call admission by estimating the congestion status in a cell based on at least one of the number and the ratio of the mobile stations on which it is judged that the value of the average transmission data rate is lower than the value of the minimum transmission data rate, the call admission can be appropriately controlled regardless of the occurrence of traffic and the mode of a cell.

The call admission control device according to claim 3 is a call admission control device in a communication system for transmitting a packet to a plurality of mobile stations. The device includes:

transmission data rate grasp means for measuring an average transmission data rate of the mobile station;

minimum transmission data rate setting means for setting the value of a minimum transmission data rate;

average transmission data rate initialization means for initializing the value of the average transmission data rate of the mobile stations when the value of the average transmission data rate of the mobile station is lower than the value of the minimum transmission data rate; and new mobile station admission means for controlling call admission of a new mobile station based on at least one of the number and the ratio of mobile stations whose average transmission data rates have been initialized. By controlling call admission by estimating the congestion status in a cell based on at least one of the number and the ratio of mobile stations whose average transmission data rates have been initialized, the call admission can be appropriately controlled regardless of the occurrence of traffic and the mode of a cell.

The call admission control device according to claim 4 of the present invention is a call admission control device in a communication system for transmitting a packet to a plurality of mobile stations n (n is a subscript to the mobile stations). The device includes:

status grasp means for grasping a radio channel quality Rn of the mobile stations n and a transmission data rate avrgRn of the mobile stations n;

minimum transmission data rate setting means for setting a minimum transmission data rate $_{target}$Rn and a transmission data rate threshold value R$_{threshold}$;

transmission data rate initialization means for initializing the value of the transmission data rate avrgRn when a value obtained by subtracting the minimum transmission data rate $_{target}$Rn from the transmission data rate avrgRn is lower than the transmission data rate threshold value R$_{threshold}$;

setting means for setting an exponent α for exponentiating the radio channel quality Rn and an exponent β for exponentiating a value obtained by subtracting the minimum transmission data rate $_{target}$Rn from the transmission data rate avrgRn;

evaluation function calculation means for calculating an evaluation function Cn for each of the mobile stations n by Cn=Rn$^α$/(avrgRn−$_{target}$Rn)$^β$;

mobile station selection means for selecting a mobile station having a maximum evaluation function Cn as a destination mobile station; and new mobile station admission means for controlling call admission of a new mobile station based on at least one of the number and the ratio of the mobile stations n whose transmission data rates avrgRn have been initialized. By performing the call admission control, the call admission can be appropriately controlled regardless of the occurrence of traffic and the mode of a cell.

The call admission control device according to claim 5 is based on the call admission control device according to claim 4. The transmission data rate initialization means initializes the value of the transmission data rate avrgRn when the transmission data rate avrgRn−$_{target}$Rn is lower than the transmission data rate threshold value R$_{threshold}$ at predetermined continuous time intervals. By controlling the call admission at predetermined continuous time intervals, the call admission can be appropriately controlled regardless of the occurrence of traffic and the mode of a cell.

The call admission control device according to claim 6 is based on claim 2. The new mobile station admission means does not admit a call of a new mobile station when at least one of the number of mobile stations on which it is judged that the average transmission data rate is lower than the minimum transmission data rate, the ratio of the number of the mobile stations, the number of the mobile stations whose average transmission data rates have been initialized, and the ratio of the number of the mobile stations is higher than a predetermined threshold value. By controlling the call admission, the call admission can be appropriately controlled regardless of the occurrence of traffic and the mode of a cell.

The call admission control device according to claim 7 is based on claim 2. The new mobile station admission means controls the call admission of a new mobile station based on the number of mobile stations performing communications in addition to at least one of the number of mobile stations on which it is judged that the average transmission data rate is lower than the minimum transmission data rate, the ratio of the number of the mobile stations, the number of the mobile stations whose average transmission data rates have been initialized, and the ratio of the number of the mobile stations. By controlling the call admission with the number of mobile stations performing communications taken into account, the call admission can be more appropriately controlled.

The call admission control device according to claim 8 is based on claim 7. The new mobile station admission means does not admit a call of a new mobile station when at least one of the number of mobile stations on which it is judged that the average transmission data rate is lower than the minimum transmission data rate, the ratio of the number of the mobile stations, the number of the mobile stations whose average transmission data rates have been initialized, and the ratio of the number of the mobile stations is higher than a predetermined threshold value, and when at least one of the number and the ratio of the mobile stations performing communications is higher than another predetermined threshold value. By controlling the call admission, the call admission can be more appropriately controlled.

The call admission control device according to claim 9 is based on claim 2. The new mobile station admission means performs a calculation depending on at least one of a service type, a contract type, a terminal type, a user identification, and a Priority Class when at least one of a number of mobile stations on which it is judged that the average transmission data rate is lower than the minimum transmission data rate, a ratio of the number of mobile stations, a number of mobile stations whose average transmission data rates have been initialized, and a ratio of the number of mobile stations is calculated. By controlling the call admission with a service type, a contract type, a terminal type, a user identification, and a Priority Class taken into account, the call admission can be more appropriately controlled.

The call admission control device according to claim 10 of the present invention is based on the call admission control device in accordance with claim 1, and the communication system is a communication system to which the HSDPA is applied. As a result, in the communication system to which the HSDPA is applied, the call admission control can be more appropriately performed.

The call admission control device according to claim 11 of the present invention is based on the call admission control device in accordance with claim 1, and the communication system is a communication system to which the Evolved UTRA and UTRAN (also referred to as Long Term Evolution or Super 3G) is applied. As a result, in the communication system to which the Evolved UTRA and UTRAN (also referred to as Long Term Evolution or Super 3G) is applied, the call admission control can be more appropriately performed.

The call admission control method according to claim 12 of the present invention is a call admission control method in a communication system for transmitting a packet to a plurality of mobile stations, and includes:

a transmission data rate grasp step of measuring an average transmission data rate of the mobile station;

a minimum transmission data rate setting step of setting a value of a minimum transmission data rate;

a judging step of judging whether or not the value of the average transmission data rate of the mobile station is lower than the value of the minimum transmission data rate; and a new mobile station admission step of controlling admission of a new mobile station based on at least one of a number and a rate of mobile stations whose values of the average transmission data rates are lower than the value of the minimum transmission data rate. By estimating the congestion status in a cell based on at least one of the number and the rate of the mobile stations whose values of the average transmission data rates are lower than the value of the minimum transmission data rate, and performing call admission control, the call admission control can be appropriately performed regardless of the manner in which traffic occurs or the mode of a cell.

As described above, the present invention has the effect of realizing appropriate call admission control regardless of the mode of a corresponding cell and data traffic by controlling call admission by estimating the congestion of the cell based on the number or the ratio of the mobile stations whose values of average transmission data rates have been initialized.

BRIEF DESCRIPTION OF THE DRAWINGS

FIG. 16 is a flowchart showing another example of the call admission judging operation of the MAC processing unit; and FIG. 17 is a flowchart showing the call admission judging operation of the MAC processing unit.

DETAILED DESCRIPTION OF THE PREFERRED EMBODIMENTS

Figure 1:
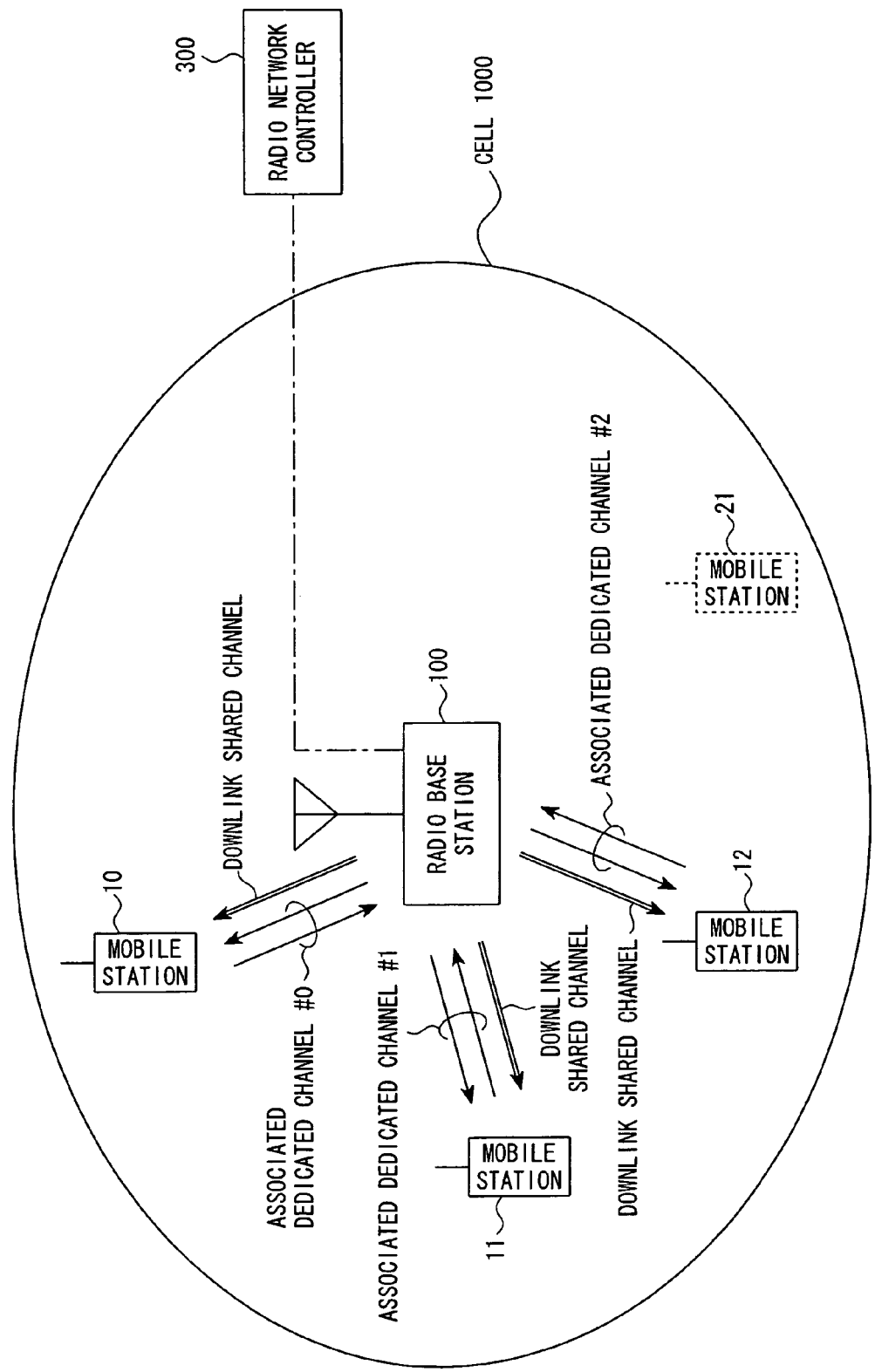
FIG. 1 shows an example of the configuration of the mobile communication system using a radio base station as a call admission control device according to the mode for embodying the present invention.

The mode for embodying the present invention is explained below by referring to the attached drawings. In the explanation below, each figure shows a component common with other figures by assigning the same reference numeral.

Embodiment Mode 1

The mode 1 for embodying the present invention is explained below by referring to the attached drawings.
(Configuration Example of the Entire System)

FIG. 1 shows an example of the configuration of the mobile communication system using the call admission control device according to the mode 1 for embodying the present invention.

In FIG. 1, the mobile communication system is constituted by a plurality of mobile stations 10 to 12 and 21, a radio base station 100 as a call admission control device, and a radio network controller 300 for controlling them, and the above-mentioned HSDPA is applied to the system. A cell 1000 is an area in which the radio base station 100 can provide communications. The mobile stations 10 to 12 are in the state in which communications are being performed using the radio base station 100 and the HSDPA in the cell 1000, and the mobile station 21 is in the state in which a new communication using the radio base station 100 and the HSDPA is to be newly started in the cell 1000.

Since the mobile stations 10 to 12 that are performing communications using the HSDPA has the same configuration, function, and status, it is explained as a mobile station n (n is an integer equal to or more than 1) unless otherwise specified. Additionally, the mobile station 21 is used as an example of a mobile station in a state in which a new communication is to be started using the HSDPA.

A communication channel in the HSDPA is explained below. In the downlink in the HSDPA, a downlink shared physical channel HS-PDSCH (High Speed Physical Downlink Shared Channel; HS-DSCH or High Speed Downlink Shared Channel in terms of a transport channel) shared by each of the mobile stations 10 to 12, a downlink shared control channel HS-SCCH (High Speed Shared Control Channel) shared by each mobile station, and a downlink associated dedicated channel (A-DPCH: associated Dedicated Physical Channel) associated with the shared physical channel dedicated to each mobile station are used. In the uplink, in addition to the uplink associated dedicated channel A-DPCH dedicated to each mobile station, a control channel HS-DPCCH (High Speed-Dedicated Physical Control Channel) for the HSDPA dedicated to each mobile station is used. In the downlink, using the downlink associated dedicated channel, a transmission power control command, etc. for the uplink associated dedicated channel is transmitted, and user data is transmitted using the shared physical channel. On the other hand, in the uplink, a pilot symbol and a power control command (TPC command) for downlink associated dedicated channel transmission are transmitted in addition to the user data using the uplink associated dedicated channel, downlink radio channel quality information used for the AMCS (adaptive modulation/coding) and the scheduling of a shared channel, and acknowledgement information of downlink shared channel HS-DSCH are transmitted using the dedicated control channel for the HSDPA (HS-DPCCH).
(Configuration Example of Radio Base Station)

Figure 2:
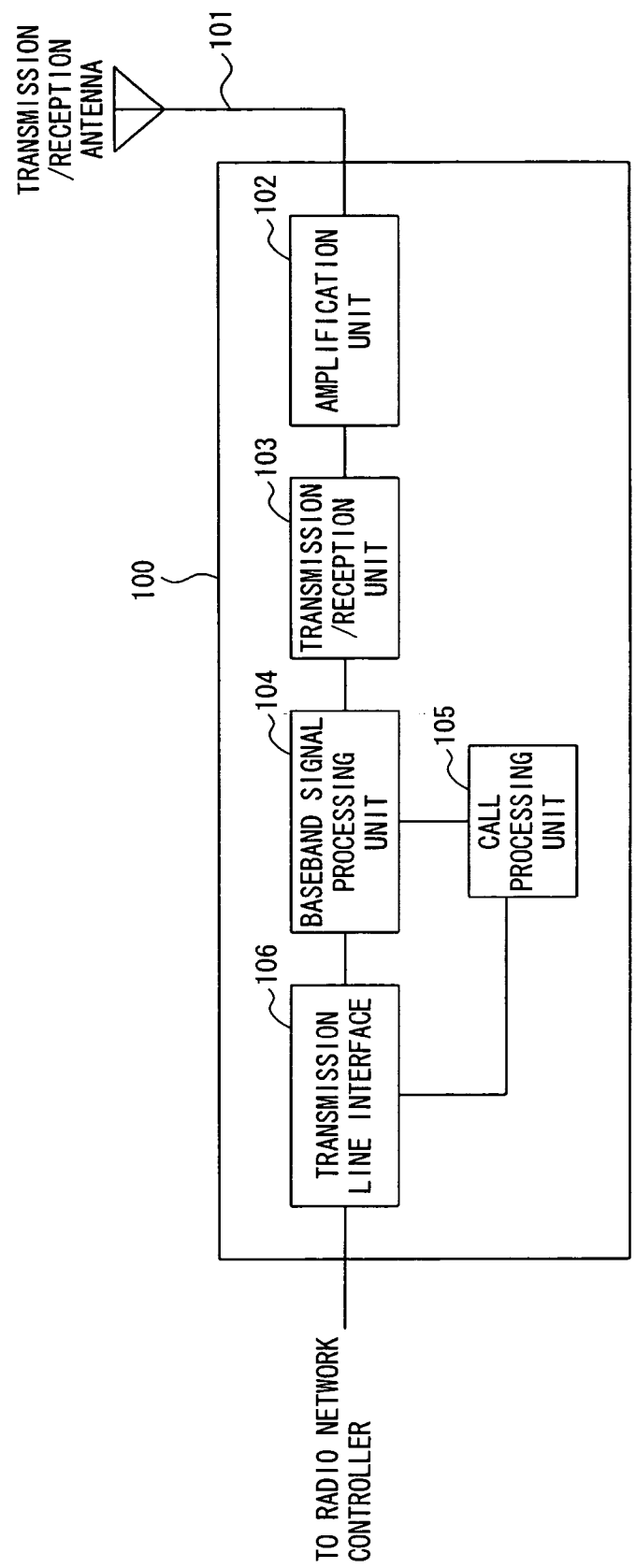
FIG. 2 is a block diagram of the function showing an example of the configuration of the radio base station shown in FIG. 1.

FIG. 2 is a block diagram of the function showing an example of the configuration of the radio base station 100 shown in FIG. 1.

In FIG. 2, the radio base station 100 is constituted by a transmission/reception antenna 101, an amplification unit 102, a transmission/reception unit 103, a baseband signal processing unit 104, a call processing unit 105, and a transmission line interface 106. The downlink packet data is input from the radio network controller 300 positioned above the radio base station 100 to the baseband signal processing unit 104 through the transmission line interface 106. The baseband signal processing unit 104 performs retransmission control (Hybrid Automatic Repeat Request (HARQ)) processing, scheduling, transmission format selection, channel coding, and a spreading process, and the result is transferred to the transmission/reception unit 103. The transmission/reception unit 103 performs a frequency converting process of converting a baseband signal output from the baseband signal processing unit 104 into a radio frequency band. Then, the resultant signal is amplified by the amplification unit 102 and transmitted through the transmission/reception antenna 101.

On the other hand, as for the uplink data, the radio frequency signal received by the transmission/reception antenna 101 is amplified by the amplification unit 102, and the transmission/reception unit 103 frequency-converts it into a baseband signal. The baseband signal is processed by the baseband signal processing unit 104 for de-spreading, RAKE combining, and error correction decoding, and then transferred to the radio network controller 300 through the transmission line interface 106.

The call processing unit 105 communicates a call processing control signal with the radio network controller 300, manages the status of the radio base station 100, and allocates resources.

(Configuration Example of Baseband Signal Processing Unit)

Figure 3:
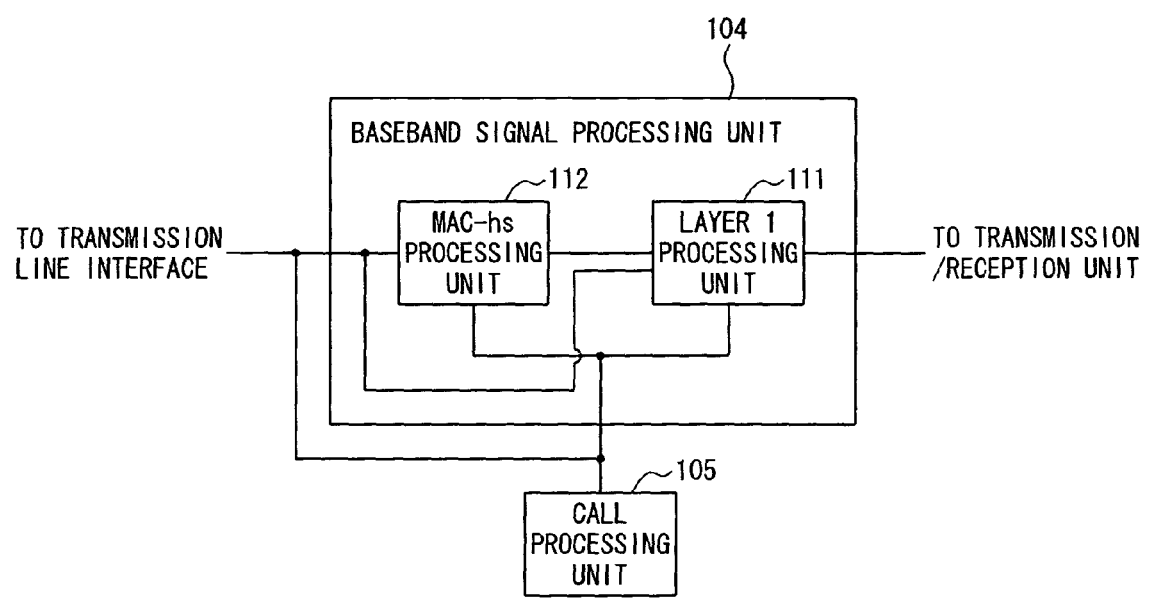
FIG. 3 is a block diagram of the function showing the configuration of the function of the baseband signal processing unit of the radio base station shown in FIG. 2.

FIG. 3 is a function block diagram showing the configuration of the function of the baseband signal processing unit 104.

In FIG. 3, the baseband signal processing unit 104 is constituted by a layer 1 processing unit 111, and a MAC-hs (short for Medium Access Control-HSDPA) processing unit 112. Each of the layer 1 processing unit 111 and the MAC-hs processing unit 112 in the baseband signal processing unit 104 is connected to the call processing unit 105. In the layer 1 processing unit 111, the processes of downlink data channel coding, uplink data channel decoding, transmission power control of uplink and downlink dedicated channels, RAKE combining, spreading/de-spreading processing are performed.

The layer 1 processing unit 111 receives the information about the downlink radio channel quality reported along the dedicated physical channel (HS-DPCCH) for the uplink HSDPA from each mobile station, and notifies the MAC-hs processing unit 112 of the information. The MAC-hs processing unit 112 performs the HARQ operation and the scheduling of packets waiting for transmission for the downlink shared channel in the HSDPA. Additionally, the MAC-hs processing unit 112 judges call admission as to whether or not the mobile station 21 can newly start communications using the HSDPA in a corresponding cell 1000 as described later.

(Configuration Example of MAC-hs Processing Unit)

Figure 4:
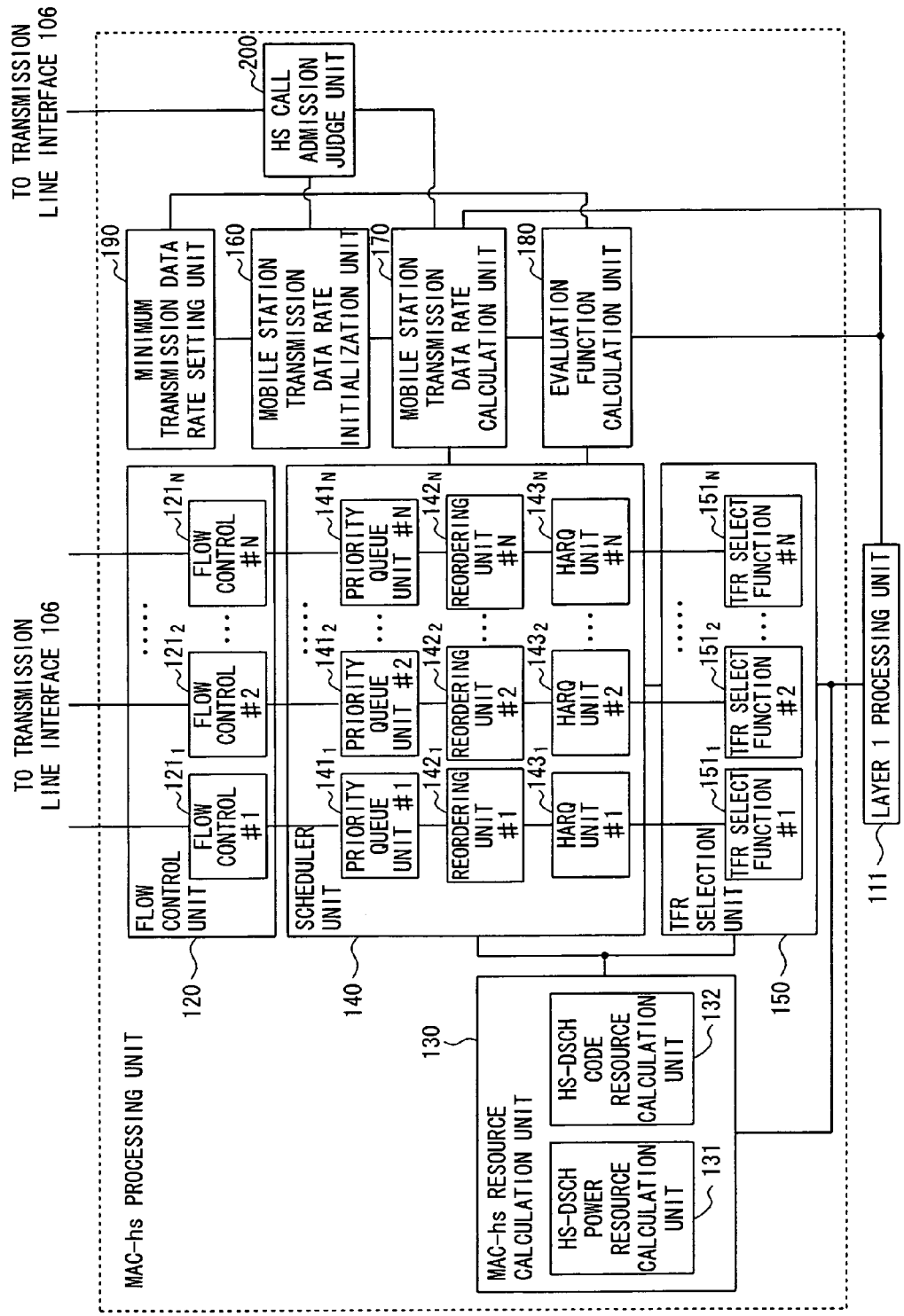
FIG. 4 is a function block diagram of the configuration showing the function configuration of the MAC-hs processing unit of the radio base station shown in FIG. 3.

FIG. 4 shows an example of the configuration showing the function of the MAC-hs processing unit 112 shown in FIG. 3. In FIG. 4, the MAC-hs processing unit 112 is constituted, for example, by the following function blocks.

(1) flow control unit 120
(2) MAC-hs resource calculation unit 130
(3) scheduler unit 140
(4) TFR (Transport Format and Resource) selection unit 150
(5) mobile station transmission data rate initialization unit 160
(6) mobile station transmission data rate calculation unit 170
(7) evaluation function calculation unit 180
(8) minimum transmission data rate setting unit 190
(9) HS call admission judge unit 200

(Flow Control Unit)

The flow control unit 120 of (1) above has the function of adjusting the transmission data rate of a signal received from the radio network controller 300 through the transmission line interface 106 based on the implemented buffer capacity and the like. Each of the flow controls (#1 to #N) 121$_1$ to 121$_N$ monitors the amount of packets, and when the amount of packets increases and the space of memory of the queue buffer decreases, the amount of transmission of packets is reduced.

(MAC-hs Resource Calculation Unit)

The MAC-hs resource calculation unit 130 of (2) above includes an HS-DSCH power resource calculation unit 131 and an HS-DSCH code resource calculation unit 132 for calculating the radio resources (power resource, code resource, hardware resource, etc.) to be allocated to the HS-DSCH.

(Scheduler Unit)

The scheduler unit 140 of (3) above includes N priority queues (#1 to #N) 141$_1$ to 141$_N$, N reordering units (#1 to #N) 142$_1$ to 142$_N$, and N HARQ units (#1 to #N) 143$_1$ to 143$_N$. The priority queues (#1 to #N) 141$_1$ to 141$_N$ are queues for each connection. Normally, one user has one priority queue. However, when one user has a plurality of connections, one user has a plurality of priority queues. The priority queues (#1 to #N) 141$_1$ to 141$_N$ receive downlink data, and accumulate the data until it is selected in the scheduling. The reordering units (#1 to #N) 142$_1$ to 142$_N$ allocate a sequence number to data so that the mobile station n can control the downlink reception order in the retransmission control in the HARQ, and perform window control so that the reception buffer of the mobile station n cannot overflow. The HARQ units (#1 to #N) 143$_1$ to 143$_N$ perform retransmission control of the HARQ based on the uplink Ack/Nack (Acknowledgment/Negative Acknowledgment) feedback using a stop and wait protocol of the M process where M indicates the number of processes.

(TFR Selection Unit)

The TFR selection unit 150 of (4) above includes N TFR select functions (#1 to #N) 151$_1$ to 151$_N$. These N TFR select functions (#1 to #N) 151$_1$ to 151$_N$ determine the transmission format (Number of codes, modulation scheme, coding rate) of the downlink transmission channel and the transmission power based on the CQI (Channel Quality Indicator) of the user selected by the scheduler unit 140, and the radio resource (power resource, code resource, hardware resource), etc. to be allocated to the HS-DSCH calculated by the MAC-hs resource calculation unit. The transmission format and the transmission power of the downlink transmission channel determined by the TFR select function are noticed to the layer 1 processing unit.

(Mobile Station Transmission Data Rate Initialization Unit)

The mobile station transmission data rate initialization unit 160 of (5) above receives the average transmission data rate (average transmission data rate calculated for each priority queues (#1 to #N) 141$_1$ to 141$_N$) avrgRn of the mobile station n from the mobile station transmission data rate calculation unit 170 described later, and receives the minimum transmission data rate $_{target}$Rn of the mobile station n from the minimum transmission data rate setting unit 190 described later. Then, it judges whether or not the average transmission data rate avrgRn is to be initialized. If it judges that the average transmission data rate avrgRn is to be initialized, the judgment result is noticed to the mobile station transmission data rate calculation unit 170. Furthermore, the mobile station transmission data rate initialization unit 160 also notifies the HS call admission judge unit 200 described later of the judgment result as to whether or not the average transmission data rate is to be initialized.

Described below is an example of the method of judging whether or not the average transmission data rate avrgRn is to be initialized.

For example, if the result of subtracting the minimum transmission data rate $_{target}$Rn from the average transmission data rate avrgRn, that is, avrgRn−$_{target}$Rn, is lower than a predetermined transmission data rate threshold value R$_{threshold}$, then it is judged that the average transmission data rate avrgRn is to be initialized.

In addition, for example, if the result of subtracting the minimum transmission data rate $_{target}$Rn from the average transmission data rate avrgRn, that is, avrgRn−$_{target}$Rn, is lower than a predetermined transmission data rate threshold value R$_{threshold}$, in the predetermined continuous time interval Time$_{threshold}$, then it is judged that the average transmission data rate avrgRn is to be initialized.

As a practical example, when avrgRn−$_{target}$Rn is constantly lower than a predetermined transmission data rate threshold value R$_{threshold}$ in the continuous 50TTI (1TTI=2 [ms], and 100[ms]), it can be judged that the average transmission data rate avrgRn is to be initialized. Otherwise, when avrgRn−$_{target}$Rn is lower than a predetermined transmission data rate threshold value R$_{threshold}$ 20 times or more in the continuous 50TTI (1TTI=2[ms], and 100[ms]), it can be judged that the average transmission data rate avrgRn is to be initialized.

The predetermined transmission data rate threshold value R$_{threshold}$ and a predetermined time interval Time$_{threshold}$ are common among all mobile stations in the above-mentioned examples, but they can also be set for each mobile station. The predetermined transmission data rate threshold value R$_{threshold}$ and a predetermined time interval Time$_{threshold}$ can also be set for each service type, contract type, terminal type, user, cell, or Priority Class.

(Mobile Station Transmission Data Rate Calculation Unit)

The mobile station transmission data rate calculation unit 170 of (6) above calculates the mobile station n (average transmission data rate). For example, based on the following equation, the transmission data rate (average transmission data rate) of the mobile station n is calculated.

$$avrgRn(t) = \delta \cdot avrgRn(t-1) + (1-\delta) \cdot rn \quad (1)$$

In the equation (1), δ is a parameter for designation of an average section, that is, a forgetting coefficient (0≦δ≦1) for averaging. The parameter δ can be set based on the service type, contract type, receiver type (Capability (index classified by a receivable modulation scheme, the number of receivable codes, bits, etc.), RAKE receiver, equalizer, reception diversity, interference canceller, other UE (User Equipment), etc.), cell type, and priority class type according to data in the priority queues 141$_1$ to 141$_N$.

In the equation (1), rn indicates the momentary transmission data rate, and in the MAC-hs processing unit 112, one of the following items is the data transmission data rate (momentary data transmission data rate) in the mobile station n.

<1> Size of data (amount of data) on which transmission has been confirmed;
<2> Size of transmitted data (amount of data); or
<3> Size of data (amount of data) that can be transmitted at the downlink momentary radio channel quality or estimated from the radio channel quality and reported from the mobile station n.

The combination of the update opportunities of average transmission data rate in the mobile station n obtained based on the equation (1) above can be indicated by the following equation (2).

Method of calculating the update opportunity rn of type #avrgRn

1. <1> for each of entire TTI in connection time
2. <2> for each of entire TTI in connection time
3. <3> for each of entire TTI in connection time
4. <1> for each TTI in which scheduling calculation is performed
5. <2> for each TTI in which scheduling calculation is performed (2)

The mobile station transmission data rate calculation unit 170 initializes the average transmission data rate avrgRn when the mobile station transmission data rate initialization unit 160 notifies it that the average transmission data rate avrgRn is to be initialized. A practical initializing method can be, for example, a method of identifying the average transmission data rate avrgRn as the momentary radio channel quality Rn, etc. The momentary radio channel quality Rn is, for example, the downlink momentary radio channel quality of the mobile station n output from the layer 1 processing unit 111, or the size of data (amount of data) that can be estimated to be transmitted based on the radio channel quality.

To obtain the average transmission data rate avrgRn of the mobile station n, in addition to the method described above, the function of measuring the transmission data rate of data in the data link layer is provided in the MAC-hs processing unit 112, and after the mobile station n enters the data communication state, the amount of data entering the MAC-hs processing unit 112 is measured at predetermined time intervals. The measured amount of data at predetermined time intervals can be the average transmission data rate avrgRn at the mobile station n.

(Evaluation Function Calculation Unit)

The evaluation function calculation unit 180 of (7) above calculates the evaluation function for each mobile station used during scheduling in the scheduler unit 140. The scheduler unit 140 selects the mobile station n having the largest evaluation function in the evaluation functions for each mobile station calculated by the evaluation function calculation unit 180, and allocates a shared channel (HS-PDSCH) to the mobile station n, that is, allocates downlink transmission.

(Minimum Transmission Data Rate Setting Unit)

The minimum transmission data rate setting unit 190 of (8) above sets the minimum transmission data rate $_{target}$Rn to be considered for the downlink packet in the priority queues (#1 to #N) 141$_1$ to 141$_N$, and notifies the mobile station transmission data rate initialization unit 160 and the evaluation function calculation unit 180 of the minimum transmission data rate $_{target}$Rn. The minimum transmission data rate setting unit 190 can be constituted to set the minimum transmission data rate $_{target}$Rn based on an indication from a remote device through the call processing unit 105.

Additionally, the minimum transmission data rate setting unit 190 can be constituted for each service type, contract type, terminal type, cell type, priority class to set the minimum transmission data rate $_{target}$Rn. For example, the service type indicates the type of service of transmitting a downlink packet, and includes, for example, a VoIP (Voice over Internet Protocol) service, a voice service, a streaming service, an FTP service, etc. The contract type indicates the type of contract made by a user of a downlink packet destination mobile station, and can be, for example, a Low Class contract, a High Class contract, etc. The terminal type indicates classification of the performance of a downlink packet destination mobile station, and a class based on the identification information about a mobile station, the presence/absence and type of a RAKE receiver, an equalizer, a reception diversity, an interference canceller, etc., the receivable modulation scheme, the number of receivable codes, the number of receivable bits, etc. The cell type indicates the type of mode of a cell in the area in which a downlink packet destination mobile station exists. For example, it includes a class according to the identification information about a cell, indoor or outdoor, urban or suburbs, a high traffic area or a low traffic area, etc. Furthermore, the priority class indicates the priority relating to the transmission of a downlink packet. For example, the first priority downlink packet is transmitted on a priority basis over the second priority downlink packet.

The minimum transmission data rate setting unit 190 is also constituted such that the value $_{minus}Rn$ to be set as a denominator of an evaluation function Cn can be set for each of the priority queues $141_1$ to $141_N$ according to the following equation.

$$avrgRn - _{target}Rn \leq _{minus}Rn \qquad (3)$$

In the equation (3), avrgRn indicates an average transmission data rate, and $_{target}Rn$ indicates a minimum transmission data rate.

The minimum transmission data rate setting unit 190 can be set as $_{target}Rn=0$. In this case, the evaluation function Cn used by the evaluation function calculation unit 180 provides common PF (Proportional Fairness) scheduling.

(HS Call Admission Judge Unit)

The HS call admission judge unit 200 of (9) above receives from the mobile station transmission data rate initialization unit 160 a judgment result as to whether or not the average transmission data rate avrgRn of the mobile station n has been initialized. Based on the number or ratio of the mobile stations whose average transmission data rates avrgRn have been initialized, it is judged whether or not the mobile station 21 can newly start communications using the HSDPA in the cell 1000, and notifies the radio network controller 300 through the transmission line interface 106 of the judgment result.

Described below is the method of the HS call admission judge unit 200 judging whether or not the mobile station 21 can newly start communications using the HSDPA in the cell 1000 based on the number or the ratio of the mobile stations whose average transmission data rates avrgRn have been initialized.

For example, the HS call admission judge unit 200 calculates the number of mobile stations whose average transmission data rates avrgRn have been initialized. If the number of mobile stations whose average transmission data rates avrgRn have been initialized is less than 10, the mobile station 21 judges that communications using the HSDPA can be newly started in the cell 1000, and if the number of mobile stations whose average transmission data rates avrgRn have been initialized is equal to or more than 10, the mobile station 21 judges that communications using the HSDPA cannot be newly started in the cell 1000.

Furthermore, for example, the HS call admission judge unit 200 calculates the ratio of the mobile stations whose average transmission data rates avrgRn have been initialized, judges that the mobile station 21 can newly start communications using the HSDPA in the cell 1000 when the ratio of the mobile stations whose average transmission data rates avrgRn have been initialized is less than 20% of the entire mobile stations performing communications using the HSDPA in the cell 1000, and judges that the mobile station 21 cannot newly start communications using the HSDPA in the cell 1000 when the ratio of the mobile stations whose average transmission data rates avrgRn have been initialized is equal to or more than 20% of the entire mobile stations performing communications using the HSDPA in the cell 1000. The entire mobile stations performing communications using the HSDPA in the cell 1000 can be all mobile stations in the state in which data is accumulated in the priority queue, or the mobile stations in the state in which the A-DPCH is set with the radio base station 100.

In the above-mentioned two examples, it is judged whether or not the mobile station 21 can newly start communications using the HSDPA in the cell 1000 based on the number of mobile stations whose average transmission data rates avrgRn have been initialized, or it is judged whether or not the mobile station 21 can newly start communications using the HSDPA in the cell 1000 based on the ratio of mobile stations whose average transmission data rates avrgRn have been initialized. However, it is also possible to judge whether or not the mobile station 21 can newly start communications using the HSDPA in the cell 1000 based on both the number and the ratio of mobile stations whose average transmission data rates avrgRn have been initialized.

The number or the ratio of mobile stations whose average transmission data rates avrgRn have been initialized refers, for example, to the number or the ratio of mobile stations whose average transmission data rates avrgRn have been initialized in a predetermined measurement time. For example, it refers to the number or ratio of the mobile stations whose average transmission data rates avrgRn have been initialized at least once in the past three minutes as viewed from the time point of the HS call admission judge unit 200 performing the judgment. Otherwise, the mobile station whose average transmission data rate avrgRn has been initialized for the times equal to or more than a predetermined threshold value in a predetermined measurement time can be a mobile station whose average transmission data rate avrgRn has been initialized. For example, it refers to the number or ratio of the initialization of the average transmission data rate avrgRn for at least three times in the past three minutes as viewed from the time point of the HS call admission judge unit 200 performing the judgment.

The judgment as to whether or not the mobile station 21 can newly start communications using the HSDPA in the cell 1000 can be performed for each Priority Class. In this case, the number or the ratio of the mobile stations whose average transmission data rates avrgRn have been initialized for each Priority Class is calculated, and the above-mentioned judgment is performed.

Otherwise, the above-mentioned judgment can be performed using the total number or ratio of the mobile stations whose average transmission data rates avrgRn have been initialized relating to a plurality of Priority Classes. In this case, the number or ratio of the mobile stations whose the average transmission data rates avrgRn have been initialized can be totalized by weighting it depending on the Priority Class. For example, when a high Priority Class and a low Priority Class coexist, the number or ratio of the mobile stations whose average transmission data rates avrgRn have been initialized can be multiplied by 1.0 for a mobile station of the high Priority Class, the number or ratio of the mobile stations whose average transmission data rates avrgRn have been initialized can be multiplied by 0.5 for a mobile station of the low Priority Class, and then the totalizing process can be performed. It is also possible that the number or ratio of the mobile stations whose average transmission data rates avrgRn have been initialized is multiplied by 0.0 for a mobile station of the low priority class, and then the totalizing process can be performed.

Otherwise, it can be judged whether or not the mobile station 21 can newly start communications using the HSDPA in the cell 1000 for each service type, contract type, terminal type, user, or cell. In this case, the number or ratio of the mobile stations whose average transmission data rates avrgRn have been initialized is calculated for each service type, contract type, terminal type, user, or cell, and the above-mentioned judgment is performed.

In the above-mentioned example, the judgment is performed using the number or ratio of the initialized mobile stations. However, when a mobile station has a plurality of priority queues, the judgment can be performed using the number or ratio of the priority queues of the initialized mobile stations. In this case, the process relating to the scheduling is also performed for each priority queue of a mobile station.

In the above-mentioned example, the HS call admission judge unit 200 judges whether or not the mobile station 21 can newly start communications using the HSDPA in the cell 1000 based on the number or ratio of the mobile stations whose average transmission data rates avrgRn have been initialized. It is also possible to more easily judge whether or not the mobile station 21 can newly start communications using the HSDPA in the cell 1000 based on the transmission data rate of the mobile station n. For example, the HS call admission judge unit 200 can receive from the mobile station transmission data rate calculation unit 170 the transmission data rate avrgRn of each mobile station n, and judge whether or not the mobile station 21 can newly start communications using the HSDPA in the cell 1000 based on the transmission data rate avrgRn of each mobile station n. Practically, based on the number or ratio of the mobile stations whose transmission data rates avrgRn are less than a predetermined threshold value, it can be judged whether or not the mobile station 21 can newly start communications using the HSDPA in the cell 1000.

(Configuration Example of Radio Network Controller)

Figure 5:
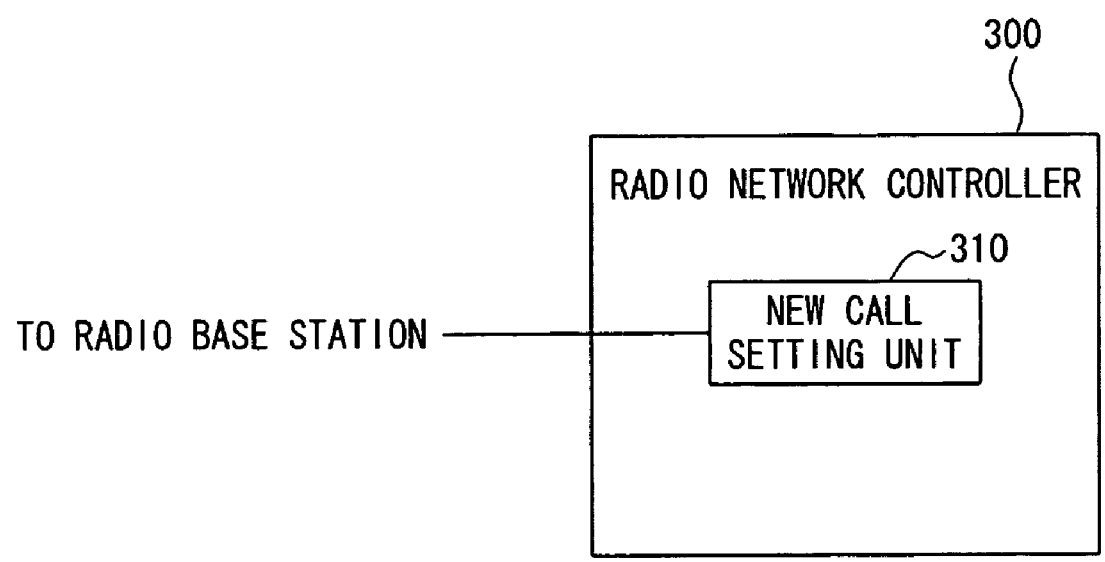
FIG. 5 is a function block diagram showing the function configuration of the radio network controller shown in FIG. 1.

FIG. 5 is a function block diagram showing the function configuration of the radio network controller 300. In FIG. 5, in the functions of the radio network controller 300, only a portion of setting a new call is described, and other functions are omitted. The radio network controller 300 includes a new call setting unit 310.

The new call setting unit 310 receives a judgment result as to whether or not the mobile station 21 can newly start communications using the HSDPA in the cell 1000 from the HS call admission judge unit 200 in the radio base station 100. When the judgment result indicates that the mobile station 21 can newly start communications using the HSDPA in the cell 1000, the new call setting unit 310 performs the process for the mobile station 21 starting communications using the HSDPA in the cell 1000. That is, it notifies the radio base station 100 and the mobile station 21 of a control signal for start of the communications, and sets the communications. On the other hand, when the judgment result indicates that the mobile station 21 cannot newly start communications using the HSDPA in the cell 1000, the new call setting unit 310 does not perform the process for the mobile station 21 starting communications using the HSDPA in the cell 1000. In this case, for example, the new call setting unit 310 can perform the process for starting communications using a dedicated channel instead of the process for starting communications using the HSDPA. In this case, the mobile station 21 performs communications using a dedicated channel in the cell 1000. Otherwise, the new call setting unit 310 can notify the mobile station 21 of the information that the communications using the HSDPA cannot be performed instead of performing the process for starting communications using the HSDPA. In this case, the communications to be started by the mobile station 21 refer to lost calls.

Although the HS call admission judge unit 200 in the radio base station 100 judges whether or not the communications using the HSDPA can be started, and the new call setting unit 310 in the radio network controller 300 actually perform call admission control as to whether or not the communications using the HSDPA are set, the present invention is not limited to this mode for embodying the present invention. That is, the radio base station 100 can judge whether or not the communications using the HSDPA can be started and set the communications using the HSDPA, or the radio network controller 300 can judge whether or not the communications using the HSDPA can be started and set the communications using the HSDPA.

Next, the operation of call admission control according to the present invention is explained below by referring to the flowchart shown in FIG. 6. Since the call admission control according to the present invention is related to the scheduling operation, the explanation is also given about the scheduling operation by referring to FIG. 7.

(Call Admission Control)

Figure 6:
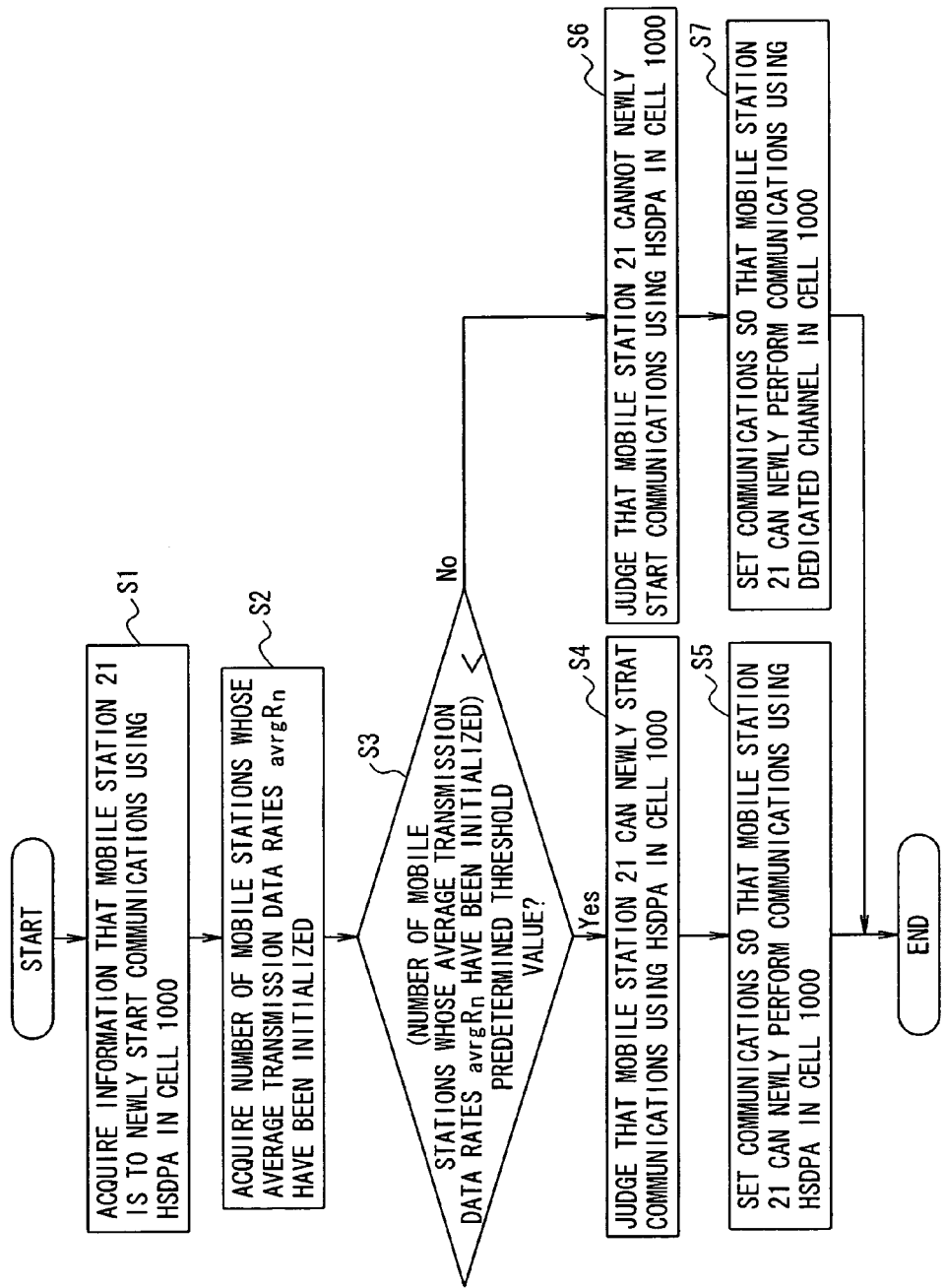
FIG. 6 is a flowchart of a call admission judging operation by the MAC-hs processing unit.

In FIG. 6, first in step S1, the HS call admission judge unit 200 acquires the information that the mobile station 21 is to newly start the communications using the HSDPA in the cell 1000. In step S2, the HS call admission judge unit 200 acquires the number of mobile stations whose average transmission data rates avrgRn have been initialized from the mobile station transmission data rate initialization unit 160.

In step S3, it is judged whether or not the number of mobile stations whose average transmission data rates avrgRn have been initialized is less than a predetermined threshold value, for example, 10. Then, if it is judged that the number of mobile stations whose average transmission data rates avrgRn have been initialized is less than a predetermined threshold value, control is passed to step S4. If it is judged that the number of mobile stations whose average transmission data rates avrgRn have been initialized is not less than a predetermined threshold value, then control is passed to step S6.

In step S4, the HS call admission judge unit 200 judges that the mobile station 21 can newly start the communications using the HSDPA in the cell 1000.

In step S5, the new call setting unit 310 performs setting communications so that the mobile station 21 can newly start communications using the HSDPA in the cell 1000.

In step S6, the HS call admission judge unit 200 judges that the mobile station 21 cannot newly start communications using the HSDPA in the cell 1000.

In step S7, the new call setting unit 310 performs setting so that the mobile station 21 can newly start communications using a dedicated channel in the cell 1000. The new call setting unit 310 judges that the mobile station 21 cannot newly start communications using the HSDPA in the cell 1000 instead of performing settings so that the mobile station 21 can newly start communications using a dedicated channel in the cell 1000, and can perform the process of not performing settings of any communications. In this case, the communications to be performed by the mobile station 21 refer to lost calls.

In the steps S2 and S3 above, the number of mobile stations whose average transmission data rates avrgRn have been initialized is used as an index. However, the ratio of the number of the mobile stations whose average transmission data rates avrgRn have been initialized to the number of all mobile stations communicating in the cell 1000 can be used.

In the description above, the processes in steps S2 to S7 are performed with the timing of the mobile station 21 newly starting the communications using the HSDPA in the cell 1000, but the processes in steps S2 to S7 can also be performed at predetermined time intervals. For example, assuming 3 seconds as a judging period, the processes in steps S2 to S7 can be performed every 3 seconds. In this case, if it is judged that the communications can be newly started in the cell 1000, the new call setting unit 310 performs settings of the communications using the HSDPA on all mobile stations that are to start communications using the HSDPA in the cell 1000 in the next 3 seconds. If it is judged that the communications cannot be newly started in the cell 1000, the new call setting unit 310 performs settings of the communications using a dedicated channel on all mobile stations that are to start communications using the HSDPA in the cell 1000 in the next 3 seconds.

(Scheduling Operation)

The scheduling operation relating to the call admission control according to the present invention is explained below by referring to FIG. 7.

Figure 7:
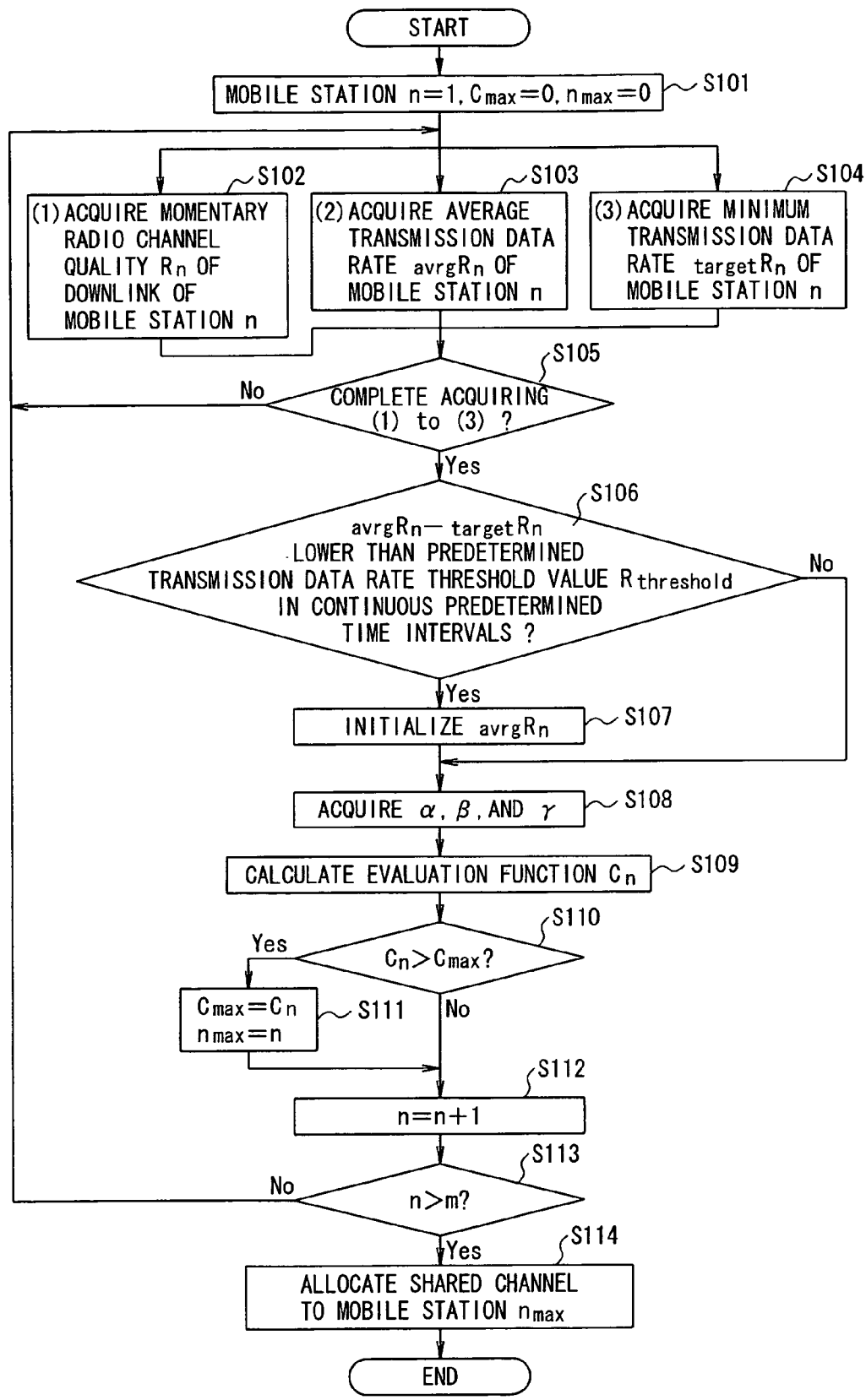
FIG. 7 is a flowchart showing an example of a scheduling operation by the MAC-hs processing unit.

In FIG. 7, the evaluation function calculation unit 180 of the MAC-hs processing unit 112 sets an initial value for calculating an evaluation function of the mobile station n in step S101.

(Setting Initial Value)

n=1

Cmax=0 nmax=0 where n indicates a subscript of a mobile station, Cmax indicates a maximum value of an evaluation function, and nmax indicates a subscript of a mobile station whose evaluation function is the maximum.

In step S102 to S104, the information about the following (1) to (3) for use in calculating the evaluation function Cn is acquired.

(1) Step S102: acquiring the downlink momentary radio channel quality of the mobile station n output from the layer 1 processing unit 111, or the size of data (amount of data) that can be estimated to be transmitted from the radio channel quality (the "the size of data that can be estimated to be transmitted from the radio channel quality" refers to the size of data estimated to be transmitted at a predetermined error rate from the CQI indicating the quality of downlink, or the momentary SIR of the downlink transmission channel, and the radio resource allocated to the HS-DSCH calculated by the MAC-hs resource calculation unit)

(2) Step S103: acquiring the average transmission data rate avrgRn of the mobile station n output from the mobile station transmission data rate calculation unit 170

(3) Step S104: acquiring the minimum transmission data rate $_{target}Rn$ of the mobile station n output from the minimum transmission data rate setting unit 190

In step S105, it is judged whether or not all information in (1) to (3) above has been acquired. If it is judged that all information in (1) to (3) has been acquired (YES in step S105), control is passed to the next step. Otherwise (NO in step S105), the information not yet acquired in the information (1) to (3) above is acquired.

In step S106, it is judged whether or not the average transmission data rate avrgRn is to be initialized. For example, in the continuous predetermined time interval $Time_{threshold}$, if $avrgRn-_{target}Rn$ is less than a predetermined transmission data rate threshold value $R_{threshold}$ (YES in step S106), control is passed to step S107. Otherwise (NO in step S106), control is passed to step S108.

In step S107, since it is judged in step S106 that the average transmission data rate avrgRn is to be initialized, the average transmission data rate avrgRn is initialized.

In step S108, an index parameter ($\alpha$, $\beta$) remotely specified through the call processing unit 105 is received, and an evalu-ation function (Cn) is calculated by the following equation (4) in step S109.

When $(avrgRn-_{target}Rn) >_{minus}Rn$, $Cn = Rn^\alpha / (avrgRn-_{target}Rn)^\beta$ When $(avrgRn-_{target}Rn) \leq _{minus}Rn$, $$Cn = Rn^\alpha /_{minus}Rn^\beta \quad (4)$$

Described below is the operation effect of initializing the average transmission data rate avrgRn in steps S106 and S107. When $avrgRn-_{target}Rn$ is close to "0", the value of the evaluation function Cn relating to the mobile station n increases. The operation is allocating on a priority basis a packet (HS-DSCH) to the mobile station n whose average transmission data rate has become lower than the minimum transmission data rate to be considered. Originally, it is a correct operation, but when there are a number of mobile stations whose average transmission data rates are lower than the minimum transmission data rate to be considered, more than necessary packets are allocated to the mobile stations, and packets are not allocated to other mobile stations, thereby degrading the throughput of the entire system. Thus, in a predetermined time interval $Time_{threshold}$, when the $avrgRn-_{target}Rn$ of the mobile station n is lower than a predetermined transmission data rate threshold value $R_{threshold}$, the degradation of the throughput of the entire system can be avoided by initializing the average transmission data rate avrgRn.

The number or ratio of the mobile stations whose average transmission data rates avrgRn are initialized can be used as an index indicating the congestion state of the cell. That is, when there are a number of mobile stations that cannot satisfy the minimum transmission data rate to be considered, it can be judged that the corresponding cell is in the congestion state. On the other hand, when there are no large number of mobile stations not capable of satisfying the minimum transmission data rate to be considered, it can be judged that the corresponding cell is not in the congestion state.

The predetermined time interval $Time_{threshold}$ and the predetermined transmission data rate threshold value $R_{threshold}$ are remotely specified from, for example, the upper node (example: radio network controller and a server on a core network, etc.) of the radio base station 100. For example, it is noticed in a call processing control signal from an upper node to the radio base station 100. The radio base station 100 receives at the call processing unit 105 the predetermined time interval $Time_{threshold}$ and the predetermined transmission data rate threshold value $R_{threshold}$ included in the call processing control signal, and transfers them to the evaluation function calculation unit 180 of the MAC-hs processing unit 112 in the baseband signal processing unit 104. Otherwise, the predetermined time interval $Time_{threshold}$ and the predetermined transmission data rate threshold value $R_{threshold}$ are held as internal data of the radio base station 100, and the evaluation function calculation unit 180 of the MAC-hs processing unit 112 in the baseband signal processing unit 104 can refer to the predetermined time interval $Time_{threshold}$ or the predetermined transmission data rate threshold value $R_{threshold}$.

In the above-mentioned example, by appropriately setting the values of $\alpha$ and $\beta$, an intermediate scheduler between the typical proportional fairness scheduler ($\alpha=1$, $\beta=1$) and the MAX/Cn scheduler ($\alpha=1$, $\beta=0$) can be provided. In addition, the present invention is not limited to the above-mentioned invention, but can be applied to a scheduler where a part of the equation of the evaluation function Cn is "$Rn^\alpha/(avrgRn-_{target}Rn)^\beta$". For example, in the case of a scheduler having the following equation $$Cn = Rn^\alpha/(avrgRn-_{target}Rn)^\beta \cdot Wn \quad (5),$$

the process of initializing the average transmission data rate avrgRn when the average transmission data rate avrgRn is lower than a predetermined transmission data rate threshold value $R_{threshold}$ in continuous predetermined time interval $Time_{threshold}$ can be added according to the present invention. However, in the equation (5) above, $\alpha$, $\beta$, and $\gamma$ are parameter coefficients, and can be any value from 0 to 1. Also in the equation (5) above, Wn indicates a resident time of a packet in a radio base station relating to the mobile station n.

As described above, when the evaluation function Cn is calculated in step S109, it is judged (step S110) whether or not the calculated evaluation function Cn is the maximum value. In this example, since Cmax=0 is set (initial value), the evaluation function Cn measured in step S109 is set as Cmax, and the mobile station n provided by Cmax is set as the mobile station nmax (step S111).

In step S112, the mobile station n is incremented by +1 to calculate the evaluation function of, the next mobile station. Unless it is judged that the mobile station n exceeds the number (m) of mobile stations communicating with the radio base station (NO in step S113), the loop process in and after step S102 is repeatedly performed until it is determined that it exceeds the number (m) of mobile stations. That is, the evaluation functions Cn of all mobile stations communicating with the radio base station are calculated. On the other hand, when it is determined in step S113 that the mobile station n exceeds the number (m) of mobile stations communicating with the radio base station (YES in step S113), the scheduler unit 140 is instructed to allocate a shared channel to the mobile station nmax set in step S111 (step S114).

According to the mode for embodying the present invention described above, in the scheduling of initializing the average transmission data rate avrgRn, by estimating the congestion state based on the number of mobile stations whose average transmission data rates avrgRn have been initialized, the call admission control can be performed regardless of the mode of a cell or the status of traffic.

The evaluation function calculation unit 180 of the MAC-hs processing unit 112 is constituted by a programmable device capable of rewriting programs such as a CPU, a digital signal processor (DSP), an FPGA (Field Programmable Gate Array), etc., a program of the above-mentioned evaluation function is stored in a predetermined memory area, and a parameter ($\alpha$, $\beta$, $\delta$, $Time_{threshold}$, $R_{threshold}$) is downloaded and rewritten. At this time, the parameter ($\alpha$, $\beta$, $\delta$, $Time_{threshold}$, $R_{threshold}$) can be downloaded from the upper node of the radio base station, or the parameter ($\alpha$, $\beta$, $\delta$, $Time_{threshold}$, $R_{threshold}$) can be directly read from the terminal by providing a terminal I/F (external interface function) for the evaluation function calculation unit 180.

Furthermore, each function block of the MAC-hs processing unit 112 can be divided by hardware, or divided by a program on a processor as software.

In the operation of the call admission control relating to the above-mentioned present invention, based on the number or the ratio of the mobile stations whose average transmission data rates avrgRn have been initialized, it is judged whether or not the mobile station 21 can newly start communications using the HSDPA in the cell 1000. However, it is also possible to more easily judge based on the transmission data rate of each mobile station n whether or not the mobile station 21 can newly start communications using the HSDPA in the cell 1000. Based on the transmission data rate of each mobile station n, the operation of the call admission control when it is judged whether or not the mobile station 21 can newly start communications using the HSDPA in the cell 1000 is explained using the flowchart shown in FIG. 8.

Figure 8:
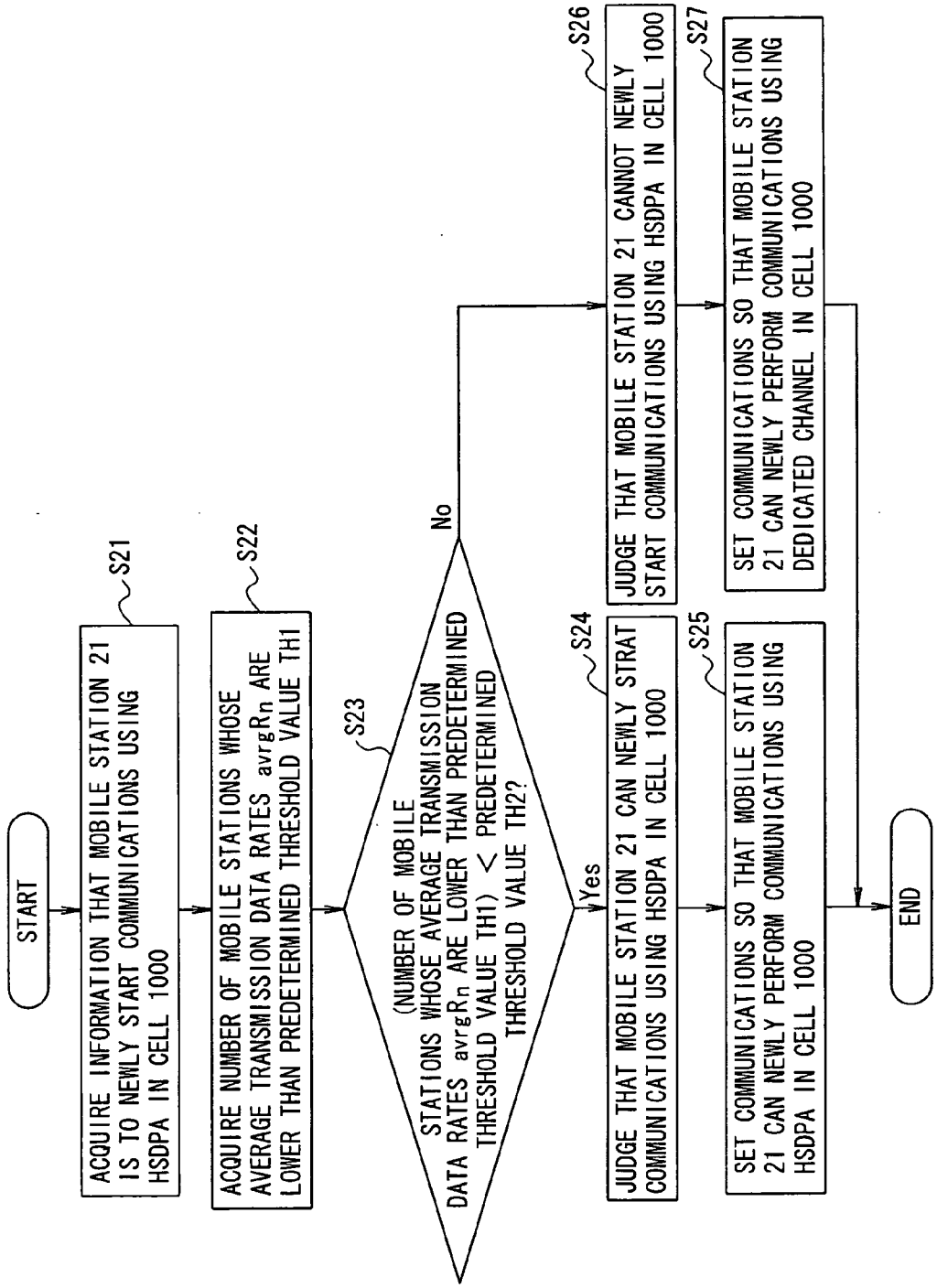
FIG. 8 is a flowchart showing another example of a call admission judging operation by the MAC-hs processing unit.

In FIG. 8, first in step S21, the HS call admission judge unit 200 acquires the information that the mobile station 21 is to newly start communications using the HSDPA in the cell 1000.

In step S22, the HS call admission judge unit 200 acquires the average transmission data rate avrgRn of each mobile station n from the mobile station transmission data rate calculation unit 170, and the number of mobile stations whose average transmission data rates avrgRn are lower than a predetermined threshold value TH1. For example, the predetermined threshold value TH1 can be set as 64 kbps. Furthermore, for example, the number of mobile stations having the above-mentioned average transmission data rate avrgRn lower a predetermined threshold value TH1 in the continuous predetermined time interval $Time_{threshold}$ can be acquired.

In step S23, it is judged whether or not the number of mobile stations having the above-mentioned average transmission data rate avrgRn lower a predetermined threshold value TH1 is lower than a predetermined threshold value TH2, for example, "10". When it is judged that the number of mobile stations having the above-mentioned average transmission data rate avrgRn lower a predetermined threshold value TH1 is lower than the threshold value TH2, control is passed to step S24. When it is judged that the number of mobile stations having the above-mentioned average transmission data rate avrgRn lower a predetermined threshold value TH1 is not lower than the threshold value TH2, control is passed to step S26.

In step S24, the HS call admission judge unit 200 judges that the mobile station 21 can newly start communications using the HSDPA in the cell 1000.

In step S25, the new call setting unit 310 sets communications so that the mobile station 21 can newly perform communications using the HSDPA in the cell 1000.

In step S26, the HS call admission judge unit 200 judges that the mobile station 21 cannot newly start communications using the HSDPA in the cell 1000.

In step S27, the new call setting unit 310 performs setting so that the mobile station 21 can newly start communications using a dedicated channel in the cell 1000. The new call setting unit 310 judges that the mobile 21 cannot newly perform communications in the cell 1000 and can perform the process of making no settings of any communications, instead of setting communications so that the mobile station 21 can newly perform communications using a dedicated channel in the cell 1000. In this case, the communications to be performed by the mobile station 21 refer to lost calls.

In steps S22 and S23, the number of mobile stations having the average transmission data rates avrgRn lower than a predetermined threshold value TH1 is used as an index, but the ratio of the number of mobile stations whose average transmission data rates avrgRn are lower than a predetermined threshold value TH1 to the number of all mobile stations communicating in the cell 1000 can be used.

In the description above, the processes in steps S22 to S27 are performed with the timing of the mobile station 21 newly starting the communications using the HSDPA in the cell 1000, but the processes in steps S22 to S27 can also be performed at predetermined time intervals. For example, assuming 3 seconds as a judging period, the processes in steps S22 to S27 can be performed every 3 seconds. In this case, if it is judged that the communications can be newly started in the cell 1000, the new call setting unit 310 performs settings of the communications using the HSDPA on all mobile stations that are to start communications using the HSDPA in the cell 1000 in the next 3 seconds. If it is judged that the communications cannot be newly started in the cell 1000, the new call setting unit 310 performs settings of the communications using a dedicated channel on all mobile stations that are to start communications using the HSDPA in the cell 1000 in the next 3 seconds.

The above-mentioned embodiment is described relating to the high speed packet transmission system HSDPA in the 3GPP, but the present invention is not limited to the above-mentioned HSDPA, and it can be applied to a high speed packet transmission system for performing transmission control (scheduling) of a downlink packet in another mobile communication system. For example, the high speed packet transmission system provided by the LTE as (Long Term Evolution) of the 3GPP, the cdma2000 1×EV-DO in the 3GPP2, and the high speed packet transmission system in the TDD system, etc. can be used as other high speed packet transmission systems. In the above-mentioned embodiment, the present invention is applied to the high speed packet transmission system in the downlink, but the present invention can be applied to the high speed packet transmission system in the uplink. The high speed packet transmission system in the uplink refers to, for example, the high speed packet transmission system in the uplink in the 3GPP, 3GPP2, and LTE.

In the above-mentioned embodiment, the function of the mobile station transmission data rate calculation unit 170 corresponds to the transmission data rate grasp means, the function of the minimum transmission data rate setting unit 190 corresponds to the minimum transmission data rate setting means, the function of the HS call admission judge unit 200 corresponds to the judge means, and the function of the new call setting unit 310 corresponds to the new mobile station admission means.

In the above-mentioned embodiment, the radio base station 100 and the radio network controller 300 correspond to the call admission control device, and the mobile stations (#1 to #3) 10 to 12 correspond to mobile stations.

Embodiment Mode 2

The mode 2 for embodying the present invention is explained below by referring to the attached drawings.

In the above-mentioned mode 1 for embodying the present invention, the HS call admission judge unit 200 judges whether or not the mobile station 21 can newly start communications using the HSDPA in the cell 1000 based on the number or ratio of the initialized average transmission data rates avrgRn. However, the call admission judgment has the following problems. For example, assume that two mobile stations are performing communication in the corresponding cell, one of them is in an environment where the radio channel quality is extremely bad, and the average transmission data rate avrgRn has been initialized. In this case, assuming that the ratio of the initialization of the average transmission data rate avrgRn is 50%, and the threshold value is 30%, it is determined that the cell is in the congestion state although there are only two mobile stations in the cell.

In the mode 2 for embodying the present invention described below, to overcome the above-mentioned problems, the call admission judgment is performed using not only the number or ratio of the initialization of the average transmission data rates avrgRn, but also the number of all mobile stations communicating in the cell.

The configuration of the mobile communication system using the call admission control device according to the mode 2 for embodying the present invention is similar to the mode 1 for embodying the present invention, and only the difference is the function of the HS call admission judge unit 200. Therefore, the description below relates to the function of the HS call admission judge unit 200, and the others are omitted.

The HS call admission judge unit 200 receives from the mobile station transmission data rate initialization unit 160 a judgment result as to whether or not the average transmission data rate avrgRn of the mobile station n has been initialized. Based on the number or the ratio of the mobile stations whose average transmission data rates avrgRn have been initialized, and the number of mobile stations communicating in the cell 1000, the HS call admission judge unit 200 judges whether or not the mobile station 21 can newly start communications using the HSDPA in the cell 1000, and notifies the radio network controller 300 through the transmission line interface 106 of the judgment result.

Described below is the method of the HS call admission judge unit 200 judging whether or not the mobile station 21 can newly start communications using the HSDPA in the cell 1000 based on the number or the ratio of the mobile stations whose average transmission data rates avrgRn have been initialized and the number of mobile stations communicating in the cell 1000.

For example, the HS call admission judge unit 200 can judge whether or not the mobile station 21 can newly start communications using the HSDPA in the cell 1000 based on the number of mobile stations whose average transmission data rates avrgRn have been initialized and the number of mobile stations communicating in the cell 1000. For example, when the number of mobile stations whose average transmission data rates avrgRn have been initialized is lower than "10", or the number of mobile stations communicating in the cell 1000 is lower than "20", it can be judged that the mobile station 21 can newly start communications using the HSDPA in the cell 1000. When the number of mobile stations whose average transmission data rates avrgRn have been initialized is equal to or higher than "10", and the number of mobile stations communicating in the cell 1000 is equal to or higher than "20", it can be judged that the mobile station 21 cannot newly start communications using the HSDPA in the cell 1000.

Additionally, for example, the HS call admission judge unit 200 can judge whether or not the mobile station 21 can newly start communications using the HSDPA in the cell 1000 based on the ratio of mobile stations whose average transmission data rates avrgRn have been initialized and the number of mobile stations communicating in the cell 1000. For example, when the ratio of mobile stations whose average transmission data rates avrgRn have been initialized is lower than 20%, or the number of mobile stations communicating in the cell 1000 is lower than "20", it can be judged that the mobile station 21 can newly start communications using the HSDPA in the cell 1000. When the ratio of mobile stations whose average transmission data rates avrgRn have been initialized is equal to or higher than 20%, and the number of mobile stations communicating in the cell 1000 is equal to or higher than "20", it can be judged that the mobile station 21 cannot newly start communications using the HSDPA in the cell 1000.

Here the number of mobile stations communicating in the cell 1000 may be the number of mobile stations with data retained in priority queue or with A-DPCH set between it and the radio base station 100.

In the above-mentioned example, depending on whether or not the number of mobile stations communicating in the cell 1000 is equal to or higher than "20" as a fixed threshold value, it is judged whether or not the mobile station 21 can newly start communications using the HSDPA in the cell 1000. However, instead of a fixed threshold value, an adaptively fluctuating threshold value can be used. For example, since the number of mobile stations capable of communicating in a cell depends on the amount of power resources allocated to the HS-PDSCH, the threshold value can be adaptively changed depending on the amount of power resources allocated to the HS-PDSCH. That is, when the amount of power resources allocated to the HS-PDSCH is 50% of the entire amount of power resources, the threshold value can be "20". When the amount of power resources allocated to the HS-PDSCH is 25% of the entire amount of power resources, the threshold value can be "10". Otherwise, control can be similarly performed using code resources not power resources.

Figure 9:
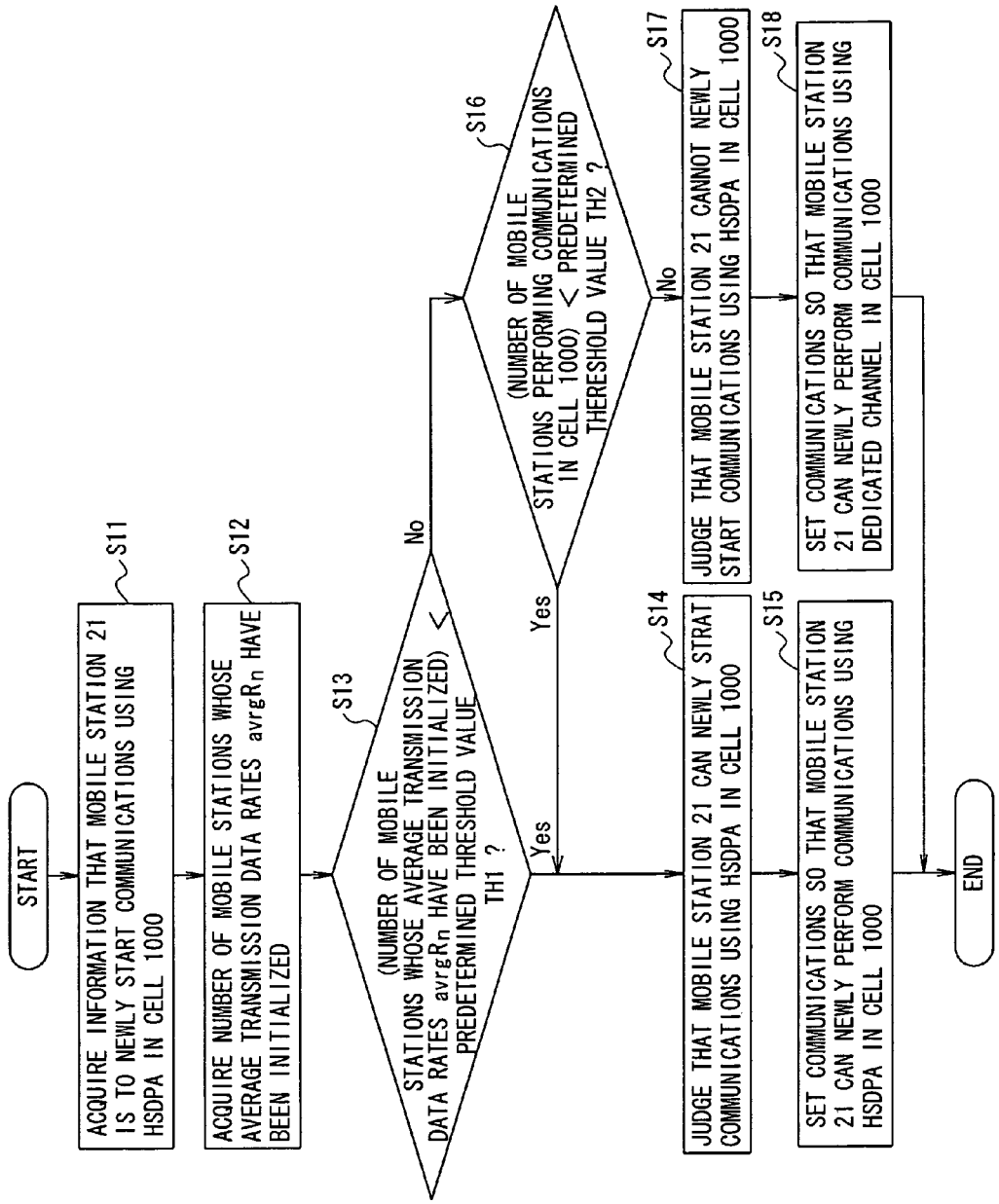
FIG. 9 is a flowchart showing an example of a call admission judging operation by the MAC-hs processing unit.

Next, the operation of the call admission control according to the mode 2 for embodying the present invention is explained by referring to the flowchart shown in FIG. 9. Since the scheduling operation relating to the call admission control according to the present invention is similar to the scheduling operation according to the mode for embodying the present invention, it is omitted here.

In FIG. 9, first in step S11, the HS call admission judge unit 200 acquires the information that the mobile station 21 is to newly start communications using the HSDPA in the cell 1000.

In step S12, the HS call admission judge unit 200 acquires from the mobile station transmission data rate initialization unit 160 the number of mobile stations whose average transmission data rates avrgRn have been initialized.

In step S13, it is judged whether or not the number of mobile stations whose average transmission data rates avrgRn have been initialized is lower than a predetermined threshold value TH1, for example, "10". If it is judged that the number of mobile stations whose average transmission data rates avrgRn have been initialized is lower than a predetermined threshold value TH1, control is passed to step S14. If it is judged that the number of mobile stations whose average transmission data rates avrgRn have been initialized is not lower than a predetermined threshold value TH1, control is passed to step S16.

In step S14, the HS call admission judge unit 200 judges that the mobile station 21 can newly start communications using the HSDPA in the cell 1000.

In step S15, the new call setting unit 310 sets communications so that the mobile station 21 can newly perform communications in the cell 1000 using the HSDPA.

In step S16, it is judged whether or not the number of mobile stations communicating in the cell 1000 is lower than a predetermined threshold value TH2, for example, "20". If it is judged that the number of mobile stations communicating in the cell 1000 is lower than a predetermined threshold value TH2, control is passed to step S14. If it is judged that the number of mobile stations communicating in the cell 1000 is not lower than a predetermined threshold value TH2, control is passed to step S17.

In step S17, the HS call admission judge unit 200 judges that the mobile station 21 cannot newly start communications using the HSDPA in the cell 1000.

In step S18, the new call setting unit 310 sets communications so that the mobile station 21 can newly perform communications in the cell 1000 using a dedicated channel. The new call setting unit 310 judges that the mobile station 21 cannot newly perform communications in the cell 1000, and can perform the process of making no settings of any communications. In this case, the communications to be performed by the mobile station 21 are loss calls.

In the above-mentioned steps S12 and S13, the number of mobile stations whose average transmission data rates avrgRn have been initialized are used as indexes, but the ratio of the number of mobile stations whose average transmission data rates avrgRn have been initialized to the number of all mobile stations communicating in the cell 1000 can also be used.

In the description above, the processes in steps S12 to S18 are performed with the timing of the mobile station 21 newly starting the communications using the HSDPA in the cell 1000, but the processes in steps S12 to S18 can also be performed at predetermined time intervals. For example, assuming 3 seconds as a judging period, the processes in steps S12 to S18 can be performed every 3 seconds. In this case, if it is judged that the communications can be newly performed in the cell 1000, the new call setting unit 310 performs settings of the communications using the HSDPA on all mobile stations that are to start communications using the HSDPA in the cell 1000 in the next 3 seconds. If it is judged that the communications cannot be newly performed in the cell 1000, the new call setting unit 310 performs settings of the communications using a dedicated channel on all mobile stations that are to start communications using the HSDPA in the cell 1000 in the next 3 seconds.

In the above-mentioned example, the HS call admission judge unit 200 judges whether or not the mobile station 21 can newly start communications using the HSDPA in the cell 1000 based on the average number or ratio of the mobile stations whose average transmission data rates avrgRn have been initialized and the number or ratio of all mobile stations performing communications in the cell. It is also possible to more easily judge whether or not the mobile station 21 can newly start communications using the HSDPA in the cell 1000 based on the average transmission data rate of the mobile station n and the number or ratio of all mobile stations performing communications in the cell. For example, the HS call admission judge unit 200 can receive from the mobile station transmission data rate calculation unit 170 the average transmission data rate avrgRn of each mobile station n, and judge whether or not the mobile station 21 can newly start communications using the HSDPA in the cell 1000 based on the transmission data rate avrgRn of each mobile station n and the number or ratio of all mobile stations performing communications in the cell. Practically, based on the number or ratio of the mobile stations whose average transmission data rates avrgRn are less than a predetermined threshold value and the number or ratio of all mobile stations performing communications in the cell, it can be judged whether or not the mobile station 21 can newly start communications using the HSDPA in the cell 1000.

Embodiment Mode 3

The mode 3 for embodying the present invention is explained below by referring to the attached drawings.

(Configuration Example of the Entire System)

Figure 10:
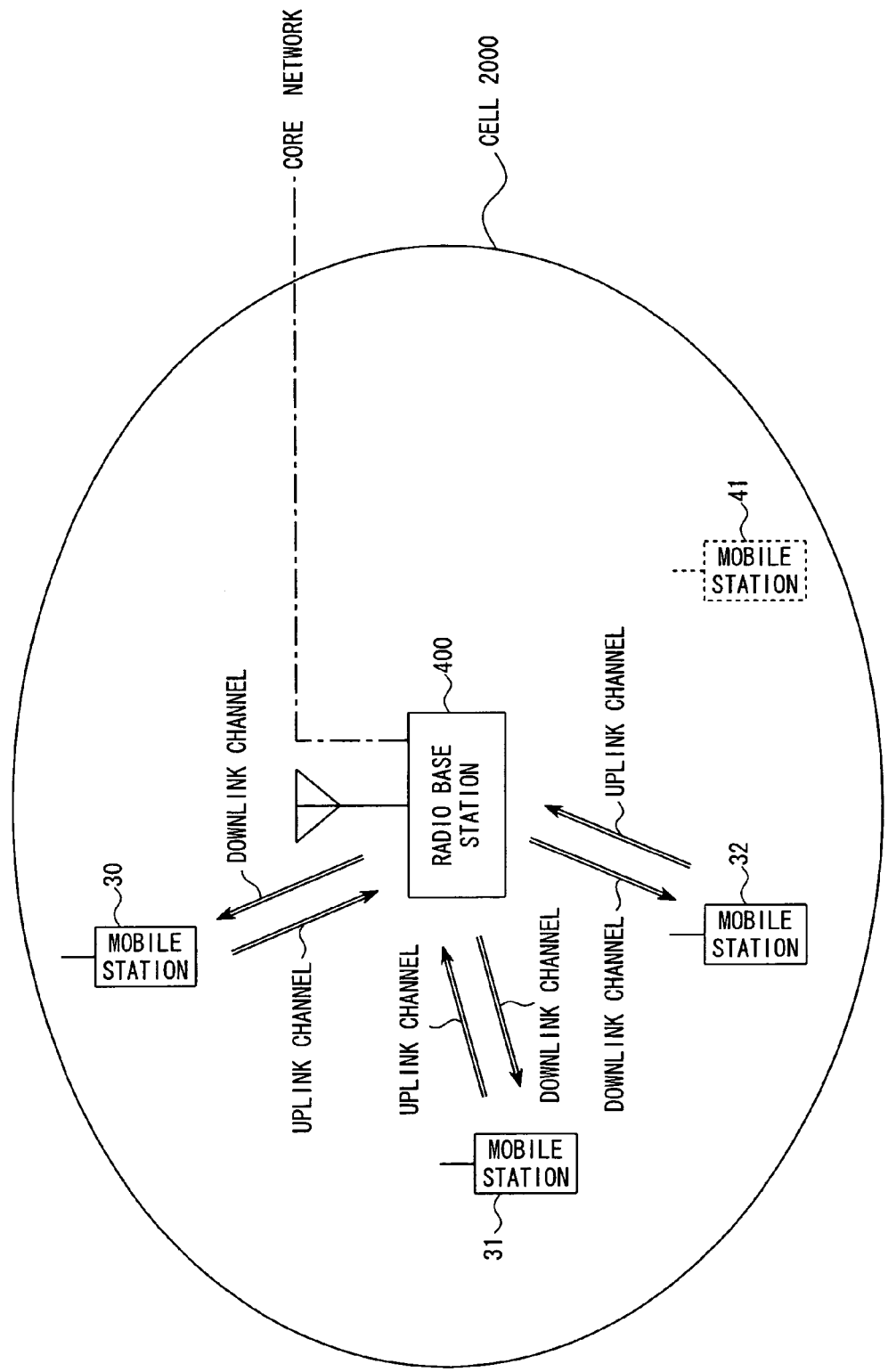
FIG. 10 shows an example of the configuration of the mobile communication system using a radio base station as a call admission control device according to another mode for embodying the present invention.

FIG. 10 shows an example of the configuration of the mobile communication system using the call admission control device according to the mode 3 for embodying the present invention.

In FIG. 10, the mobile communication system is constituted by a plurality of mobile stations 30 to 32 and 41, a radio base station 400 as a call admission control device, and the above-mentioned the Evolved UTRA and UTRAN (also referred to as Long Term Evolution or Super 3G) is applied to the system. In the Evolved UTRA and UTRAN (also referred to as Long Term Evolution or Super 3G), the radio base station 400 has the functions of both the radio base station 100 and the radio network controller 300 in the HSDPA. A cell 2000 is an area in which the radio base station 400 can provide communications. The mobile stations 30 to 32 are in the state in which communications with the radio base station 400 are being performed using the Evolved UTRA and UTRAN (also referred to as Long Term Evolution or Super 3G) in the cell 2000, and the mobile station 41 is in the state in which a new communication with the radio base station 400 using the Evolved UTRA and UTRAN (also referred to as Long Term Evolution or Super 3G) is to be newly started in the cell 2000.

Since the mobile stations 30 to 32 that are performing communications using the Evolved UTRA and UTRAN (also referred to as Long Term Evolution or Super 3G) has the same configuration, function, and status, it is explained as a mobile station n (n is an integer equal to or more than 1) unless otherwise specified. Additionally, the mobile station 41 is used as an example of a mobile station in a state in which a new communication is to be started using the Evolved UTRA and UTRAN (also referred to as Long Term Evolution or Super 3G).

Described below is the communication channel in the Evolved UTRA and UTRAN (also referred to as Long Term Evolution or Super 3G). In the downlink, in the Evolved UTRA and UTRAN (also referred to as Long Term Evolution or Super 3G), a physical downlink shared channel PDSCH shared among the mobile stations 30 to 32 and a downlink control channel for the LTE are used. The downlink channel shown in FIG. 10 refers to the physical downlink shared channel PDSCH and the downlink control channel for the LTE. Also in the uplink, a physical uplink shared channel PUSCH shared among the mobile stations 30 to 32 and an uplink control channel for the LTE are used. The uplink channel shown in FIG. 10 refers to the physical uplink shared channel PUSCH and the uplink control channel for the LTE. The uplink control channel can be one of the two types, that is, a channel to be time-multiplexed with the physical uplink shared channel PUSCH and a channel to be frequency-multiplexed with it. In the downlink, user information mapped in the physical downlink shared channel, the information about a transport format, etc. are reported through the downlink control channel for the LTE, and user data is transmitted through the physical downlink shared channel. On the other hand, in the uplink, the downlink quality information for use in the scheduling of a shared physical channel in the downlink and the AMCS (adaptive modulation and coding), and the acknowledgement information for the downlink shared physical channel PDSCH are transmitted through the uplink control channel for the LTE. Furthermore, the user information mapped in the physical uplink shared channel, the information about the transport format, etc. are reported through the uplink control channel for the LTE, and the user data is transmitted through the physical uplink shared channel.

(Configuration Example of Radio Base Station)

Figure 11:
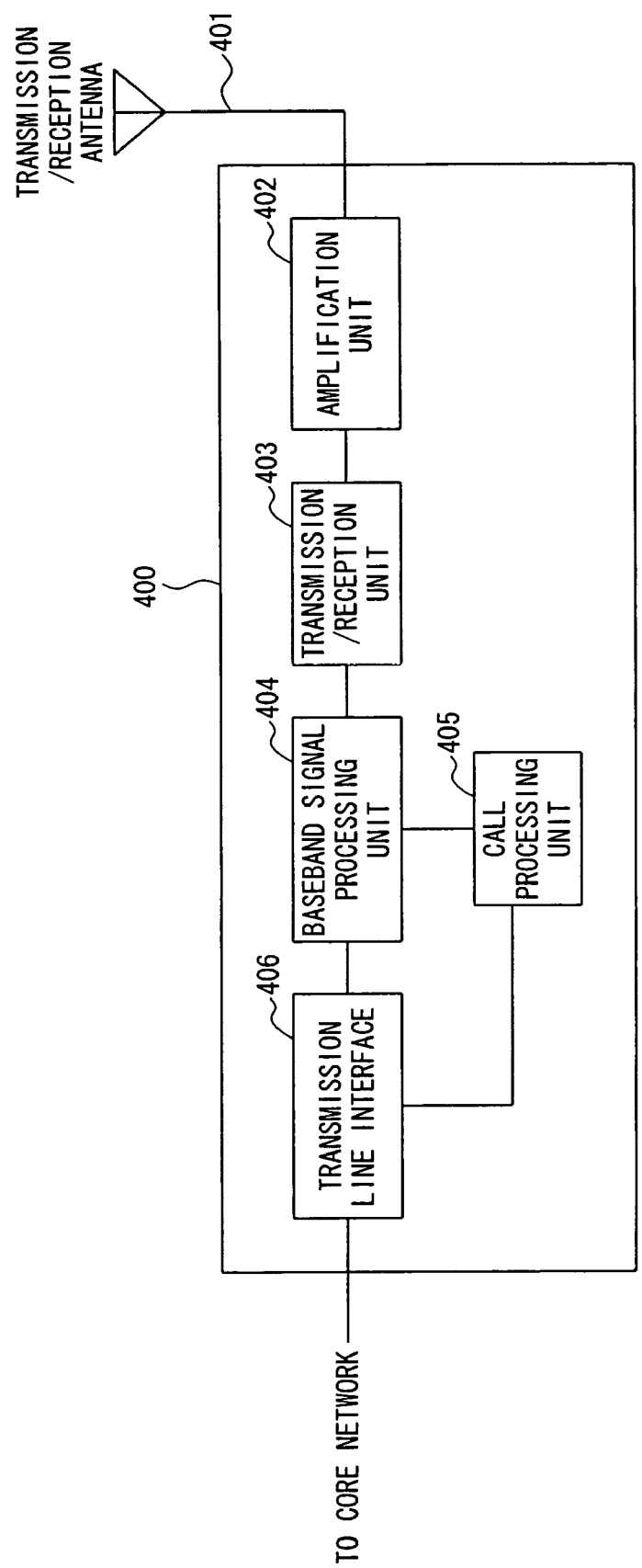
FIG. 11 is a block diagram showing the functions of a configuration example of the radio base station shown in FIG. 10.

FIG. 11 is a block diagram of the function showing an example of the configuration of the radio base station 400 shown in FIG. 10.

In FIG. 11, the radio base station 400 is constituted by a transmission/reception antenna 401, an amplification unit 402, a transmission/reception unit 403, a baseband signal processing unit 404, a call processing unit 405, and a transmission line interface 406. The downlink packet data is input from the access gateway device 600 positioned above the radio base station 400 to the baseband signal processing unit 404 through the transmission line interface 406. The baseband signal processing unit 404 performs dividing and combining of packet data, a transmission process of an RLC layer such as a transmission process in RLC re-transmission control, a transmission process in MAC retransmission control (Hybrid Automatic Repeat Request (HARQ)) processing, scheduling, transmission format selection, channel coding, and an IFFT process, and the result is transferred to the transmission/reception unit 403. The transmission/reception unit 403 performs a frequency converting process of converting a baseband signal output from the baseband signal processing unit 404 into a radio frequency band. Then, the resultant signal is amplified by the amplification unit 402 and transmitted through the transmission/reception antenna 401.

On the other hand, as for the uplink data, the radio frequency signal received by the transmission/reception antenna 401 is amplified by the amplification unit 402, and the transmission/reception unit 403 frequency-converts it into a baseband signal. The baseband signal is processed by the baseband signal processing unit 404 for an FFT process, error correction decoding, a reception process in MAC retransmission control, a reception process of an RLC layer and then transferred to the access gateway device 600 through the transmission line interface 406.

The call processing unit 405 manages the state management of the radio base station 400 and allocates resources. The call processing unit 405 is also provided with the new call setting unit 413, and performs a process for the mobile station 41 starting the communication in the cell 2000 using the Evolved UTRA and UTRAN (also referred to as Long Term Evolution or Super 3G) based on the judgment result as to whether or not the mobile station 41 can newly start the communication in the cell 2000 using the Evolved UTRA and UTRAN (also referred to as Long Term Evolution or Super 3G), which is received from the LTE call admission judgment unit 500 described later. The explanation of the new call setting unit 413 is given later.

(Configuration Example of Baseband Signal Processing Unit)

Figure 12:
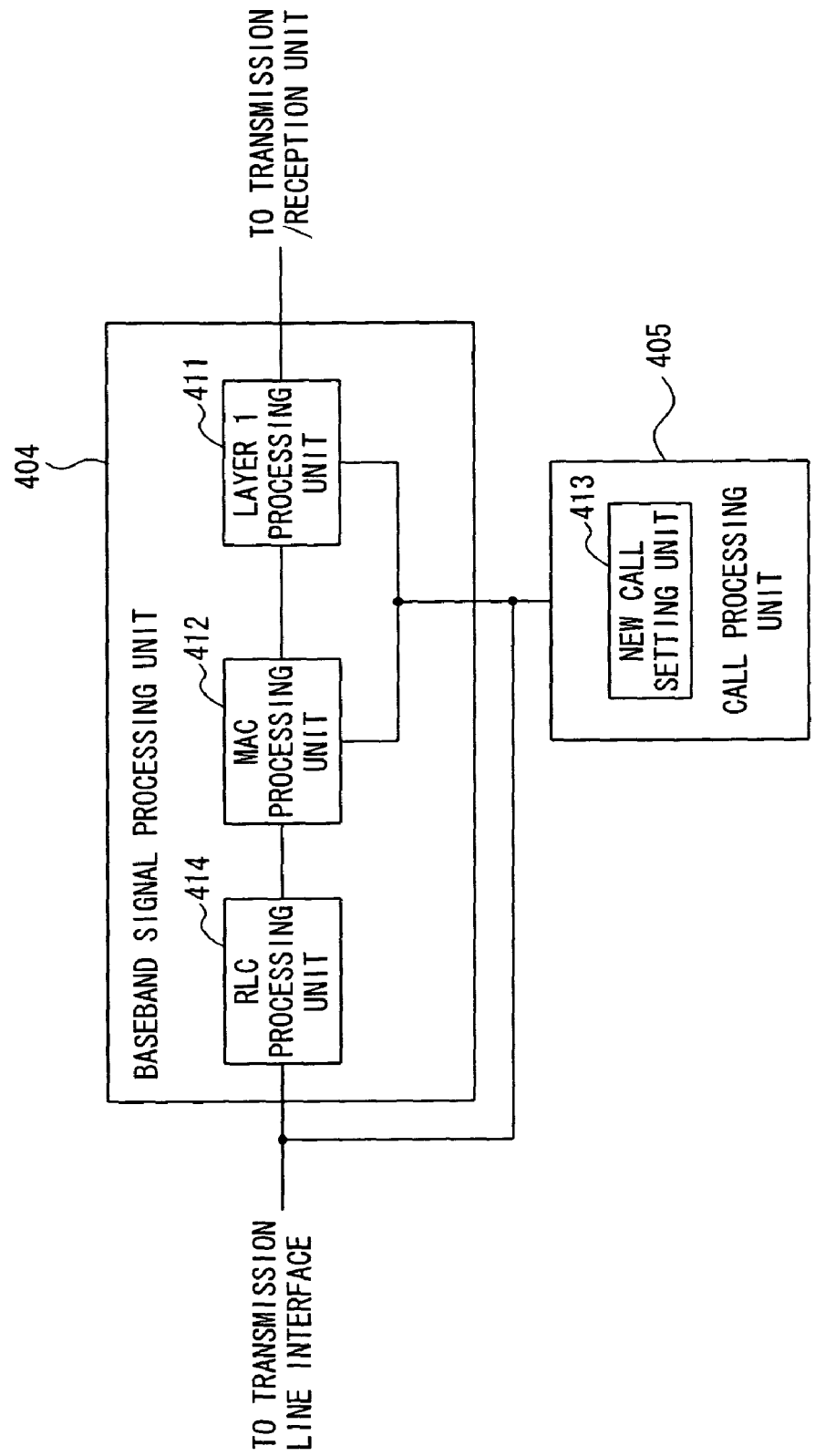
FIG. 12 is a block diagram of the functions showing the configuration of the functions of the baseband signal processing unit of the radio base station shown in FIG. 11.

FIG. 12 is a function block diagram showing the configuration of the function of the baseband signal processing unit 404.

In FIG. 12, the baseband signal processing unit 404 is constituted by a layer 1 processing unit 411, a MAC (short for Medium Access Control) processing unit 412, and an RLC processing unit 414. Each of the layer 1 processing unit 411 and the MAC processing unit 412 in the baseband signal processing unit 404 is connected to the call processing unit 405. In the layer 1 processing unit 411, the processes of downlink data channel coding, uplink data channel decoding, IFFT/FFT processes and the like are performed.

The layer 1 processing unit 411 receives the information about the downlink radio channel quality reported along the uplink control channel for LTE from each mobile station, and notifies the MAC processing unit 412 of the information. The MAC processing unit 412 performs the HARQ operation and the scheduling of packets waiting for transmission for the downlink shared physical channel in the Evolved UTRA and UTRAN (also referred to as Long Term Evolution or Super 3G). Additionally, the MAC processing unit 412 judges call admission as to whether or not the mobile station 41 can newly start communications using the Evolved UTRA and UTRAN (also referred to as Long Term Evolution or Super 3G) in a corresponding cell 2000 as described later. The RLC processing unit 414 performs a process of a transmission process of an RLC layer such as dividing, combining, RLC re-transmission control relating to packet data in the downlink, and a process of a reception process of an RLC layer such as dividing, combining, RLC re-transmission control relating to packet data in the uplink.
(Configuration Example of MAC Processing Unit)

Figure 13:
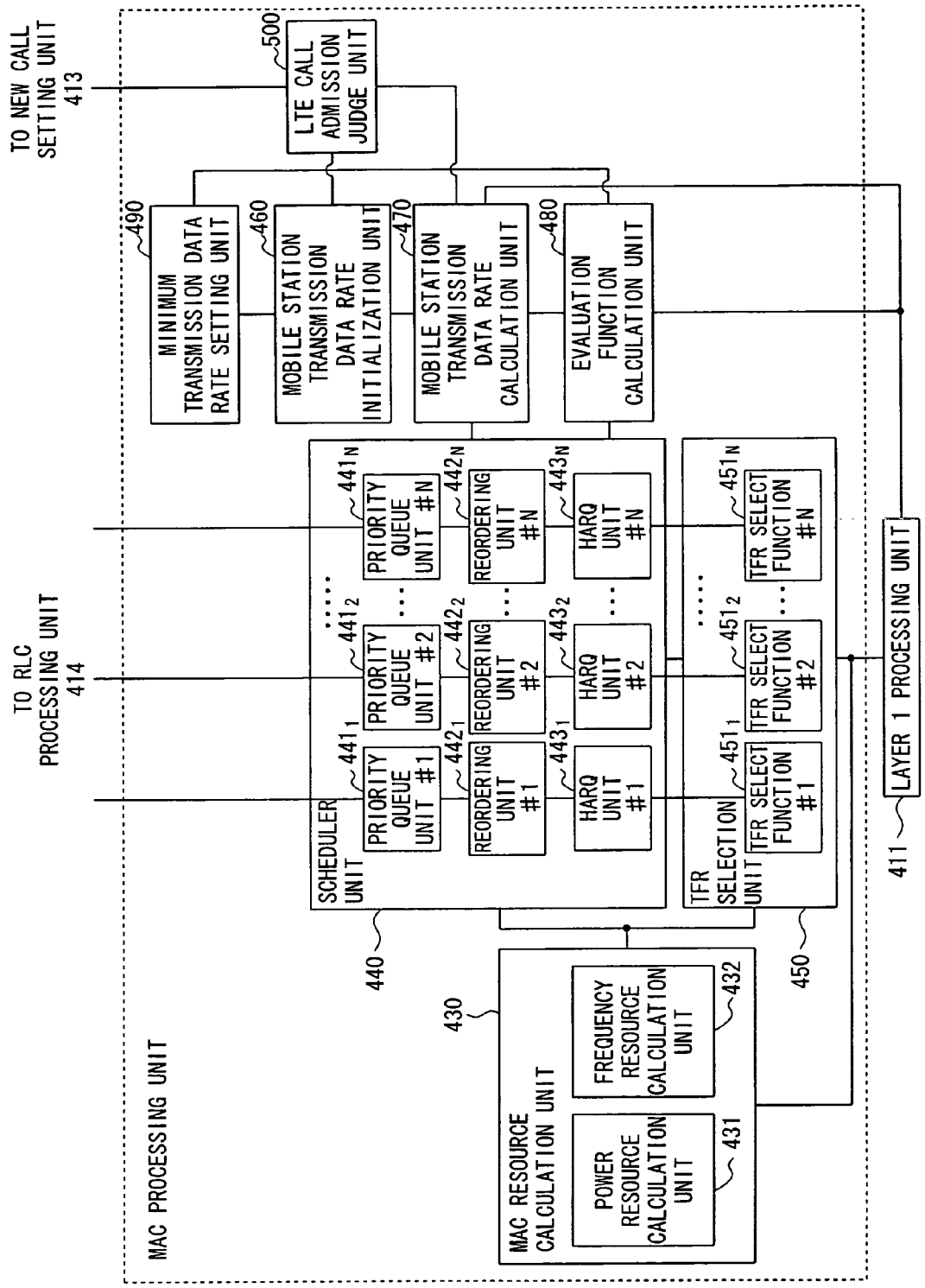
FIG. 13 is a block diagram of the functions showing the configuration of the functions of the MAC processing unit of the radio base station shown in FIG. 12.

FIG. 13 shows an example of the configuration showing the function of the MAC processing unit 412 shown in FIG. 12. In FIG. 13, the MAC processing unit 412 is constituted, for example, by the following function blocks
(1) MAC resource calculation unit 430
(2) scheduler unit 440
(3) TFR (Transport Format and Resource) selection unit 450
(4) mobile station transmission data rate initialization unit 460
(5) mobile station transmission data rate calculation unit 470
(6) evaluation function calculation unit 480
(7) minimum transmission data rate setting unit 490
(8) LTE call admission judge unit 500
(MAC Resource Calculation Unit)

The MAC resource calculation unit 430 of (1) above includes a Power resource calculation unit 431 and a frequency resource calculation unit 432 for calculating the radio resources (power resource, frequency resource, hardware resource, etc.) to be allocated to the PDSCH.
(Scheduler Unit)

The scheduler unit 440 of (2) above includes N priority queues (#1 to #N) 4411 to 441N, N reordering units (#1 to #N) 4421 to 442N, and N HARQ units (#1 to #N) 4431 to 443N. The priority queues (#1 to #N) 4411 to 441N are queues for each connection. Normally, one user has one priority queue. However, when one user has a plurality of connections, one user has a plurality of priority queues. The priority queues (#1 to #N) 4411 to 441N receive downlink data, and accumulate the data until it is selected in the scheduling. The reordering units (#1 to #N) 4421 to 442N allocate a sequence number to data so that the mobile station n can control the downlink reception order in the retransmission control in the HARQ, and perform window control so that the reception buffer of the mobile station n cannot overflow. The HARQ units (#1 to #N) 4431 to 443N perform retransmission control of the HARQ based on the uplink Ack/Nack (Acknowledgment/Negative Acknowledgment) feedback using a stop and wait protocol of the M process where M indicates the number of processes.
(TFR Selection Unit)

The TFR selection unit 450 of (3) above includes N TFR select functions (#1 to #N) 4511 to 451N. These N TFR select functions (#1 to #N) 4511 to 451N determine the transmission format (Number of resource blocks, modulation scheme, coding rate) of the downlink transmission channel and the transmission power based on the CQI (Channel Quality Indicator) of the user selected by the scheduler unit 440, and the radio resource (power resource, frequency resource, hardware resource), etc. to be allocated to the PDSCH calculated by the MAC resource calculation unit. The resource blocks correspond to the frequency resources. The transmission format and the transmission power of the downlink transmission channel determined by the TFR select function are noticed to the layer 1 processing unit.
(Mobile Station Transmission Data Rate Initialization Unit)

The mobile station transmission data rate initialization unit 460 of (4) above receives the average transmission data rate (average transmission data rate calculated for each priority queues (#1 to #N) 4411 to 441N) avrgRn of the mobile station n from the mobile station transmission data rate calculation unit 470 described later, and receives the minimum transmission data rate targetRn of the mobile station n from the minimum transmission data rate setting unit 490 described later. Then, it judges whether or not the average transmission data rate avrgRn is to be initialized. If it judges that the average transmission data rate avrgRn is to be initialized, the judgment result is noticed to the mobile station transmission data rate calculation unit 470. Furthermore, the mobile station transmission data rate initialization unit 460 also notifies the LTE call admission judge unit 500 described later of the judgment result as to whether or not the average transmission data rate is to be initialized.

Described below is an example of the method of judging whether or not the average transmission data rate avrgRn is to be initialized.

For example, if the result of subtracting the minimum transmission data rate targetRn from the average transmission data rate avrgRn, that is, avrgRn−targetRn, is lower than a predetermined transmission data rate threshold value Rthreshold, then it is judged that the average transmission data rate avrgRn is to be initialized.

In addition, for example, if the result of subtracting the minimum transmission data rate targetRn from the average transmission data rate avrgRn, that is, avrgRn−targetRn, is lower than a predetermined transmission data rate threshold value Rthreshold, in the predetermined continuous time interval Timethreshold, then it is judged that the average transmission data rate avrgRn is to be initialized.

As a practical example, when avrgRn−targetRn is constantly lower than a predetermined transmission data rate threshold value Rthreshold in the continuous 50TTI (1TTI=1 [ms], and 50[ms]), it can be judged that the average transmission data rate avrgRn is to be initialized. Otherwise, when avrgRn−targetRn is lower than a predetermined transmission data rate threshold value Rthreshold 20 times or more in the continuous 50TTI (1TTI=1[ms], and 50[ms]), it can be judged that the average transmission data rate avrgRn is to be initialized.

The predetermined transmission data rate threshold value Rthreshold and a predetermined time interval Timethreshold are common among all mobile stations in the above-mentioned examples, but they can also be set for each mobile station. The predetermined transmission data rate threshold value Rthreshold and a predetermined time interval Timethreshold can also be set for each service type, contract type, terminal type, user, cell, or Priority Class.
(Mobile Station Transmission Data Rate Calculation Unit)

The mobile station transmission data rate calculation unit 470 of (5) above calculates the mobile station n (average transmission data rate). For example, based on the following equation, the transmission data rate (average transmission data rate) of the mobile station n is calculated.

$$avrgRn(t)=\delta \cdot avrgRn(t-1)+(1-\delta) \cdot rn \quad (6)$$

In the equation (6), $\delta$ is a parameter for designation of an average section, that is, a forgetting coefficient ($0 \leq \delta \leq 1$) for averaging. The parameter $\delta$ can be set based on the service type, contract type, receiver type (Capability (index classified by a receivable modulation scheme, the number of receivable bits, etc.) of UE (User Equipment), etc.), cell type, and priority class type according to data in the priority queues 4411 to 441N.

In the equation (6), rn indicates the momentary transmission data rate, and in the MAC processing unit 412, one of the following items is the data transmission data rate (momentary data transmission data rate) in the mobile station n.
<1> Size of data (amount of data) on which transmission has been confirmed;
<2> Size of transmitted data (amount of data); or <3> Size of data (amount of data) that can be transmitted at the downlink momentary radio channel quality or estimated from the radio channel quality and reported from the mobile station n.

The combination of the update opportunities of average transmission data rate in the mobile station n obtained based on the equation (6) above can be indicated by the following equation (7).

Method of calculating the update opportunity rn of type #avrgRn

1. <1> for each of entire TTI in connection time

2. <2> for each of entire TTI in connection time

3. <3> for each of entire TTI in connection time

4. <1> for each TTI in which scheduling calculation is performed

5. <2> for each TTI in which scheduling calculation is performed    (7)

The mobile station transmission data rate calculation unit 470 initializes the average transmission data rate avrgRn when the mobile station transmission data rate initialization unit 460 notifies it that the average transmission data rate avrgRn is to be initialized. A practical initializing method can be, for example, a method of identifying the average transmission data rate avrgRn as the momentary radio channel quality Rn, etc. The momentary radio channel quality Rn is, for example, the downlink momentary radio channel quality of the mobile station n output from the layer 1 processing unit 411, or the size of data (amount of data) that can be estimated to be transmitted based on the radio channel quality.

To obtain the average transmission data rate avrgRn of the mobile station n, in addition to the method described above, the function of measuring the transmission data rate of data in the data link layer is provided in the MAC processing unit 412, and after the mobile station n enters the data communication state, the amount of data entering the MAC processing unit 412 is measured at predetermined time intervals. The measured amount of data at predetermined time intervals can be the average transmission data rate avrgRn at the mobile station n.

(Evaluation Function Calculation Unit)

The evaluation function calculation unit 480 of (6) above calculates the evaluation function for each mobile station used during scheduling in the scheduler unit 440. The scheduler unit 440 selects the mobile station n having the largest evaluation function in the evaluation functions for each mobile station calculated by the evaluation function calculation unit 480, and allocates a physical shared channel (PDSCH) to the mobile station n, that is, allocates downlink transmission.

(Minimum Transmission Data Rate Setting Unit)

The minimum transmission data rate setting unit 490 of (7) above sets the minimum transmission data rate targetRn to be considered for the downlink packet in the priority queues (#1 to #N) 4411 to 441N, and notifies the mobile station transmission data rate initialization unit 460 and the evaluation function calculation unit 480 of the minimum transmission data rate targetRn. The minimum transmission data rate setting unit 490 can be constituted to set the minimum transmission data rate targetRn based on an indication from a remote device through the call processing unit 405.

Additionally, the minimum transmission data rate setting unit 490 can be constituted for each service type, contract type, terminal type, cell type, priority class to set the minimum transmission data rate targetRn. For example, the service type indicates the type of service of transmitting a downlink packet, and includes, for example, a VoIP (Voice over Internet Protocol) service, a voice service, a streaming service, an FTP service, etc. The contract type indicates the type of contract made by a user of a downlink packet destination mobile station, and can be, for example, a Low Class contract, a High Class contract, etc. The terminal type indicates classification of the performance of a downlink packet destination mobile station, and a class based on the identification information about a mobile station, the receivable modulation scheme, the number of bits, etc. The cell type indicates the type of mode of a cell in the area in which a downlink packet destination mobile station exists. For example, it includes a class according to the identification information about a cell, indoor or outdoor, urban or suburbs, a high traffic area or a low traffic area, etc. Furthermore, the priority class indicates the priority relating to the transmission of a downlink packet. For example, the first priority downlink packet is transmitted on a priority basis over the second priority downlink packet.

The minimum transmission data rate setting unit 490 is also constituted such that the value minusRn to be set as a denominator of an evaluation function Cn can be set for each of the priority queues 4411 to 441N according to the following equation.

$$avrgRn - targetRn \leq minusRn \quad (8)$$

In the equation (8), avrgRn indicates an average transmission data rate, and targetRn indicates a minimum transmission data rate.

The minimum transmission data rate setting unit 490 can be set as targetRn=0. In this case, the evaluation function Cn used by the evaluation function calculation unit 480 provides common PF (Proportional Fairness) scheduling.

(LTE Call Admission Judge Unit)

The LTE call admission judge unit 500 of (8) above receives from the mobile station transmission data rate initialization unit 460 a judgment result as to whether or not the average transmission data rate avrgRn of the mobile station n has been initialized. Based on the number or ratio of the mobile stations whose average transmission data rates avrgRn have been initialized, it is judged whether or not the mobile station 41 can newly start communications using the Evolved UTRA and UTRAN (also referred to as Long Term Evolution or Super 3G) in the cell 2000, and notifies the new call setting unit 413 in the call processing unit 405 of the judgment result.

Described below is the method of the LTE call admission judge unit 500 judging whether or not the mobile station 41 can newly start communications using the Evolved UTRA and UTRAN (also referred to as Long Term Evolution or Super 3G) in the cell 2000 based on the number or the ratio of the mobile stations whose average transmission data rates avrgRn have been initialized.

For example, the LTE call admission judge unit 500 calculates the number of mobile stations whose average transmission data rates avrgRn have been initialized. If the number of mobile stations whose average transmission data rates avrgRn have been initialized is less than 10, the mobile station 41 judges that communications using the Evolved UTRA and UTRAN (also referred to as Long Term Evolution or Super 3G) can be newly started in the cell 2000, and if the number of mobile stations whose average transmission data rates avrgRn have been initialized is equal to or more than 10, the mobile station 41 judges that communications using the Evolved UTRA and UTRAN (also referred to as Long Term Evolution or Super 3G) cannot be newly started in the cell 2000.

Furthermore, for example, the LTE call admission judge unit 500 calculates the ratio of the mobile stations whose average transmission data rates avrgRn have been initialized, judges that the mobile station 41 can newly start communications using the Evolved UTRA and UTRAN (also referred to as Long Term Evolution or Super 3G) in the cell 2000 when the ratio of the mobile stations whose average transmission data rates avrgRn have been initialized is less than 20% of the entire mobile stations performing communications using the Evolved UTRA and UTRAN (also referred to as Long Term Evolution or Super 3G) in the cell 2000, and judges that the mobile station 41 cannot newly start communications using the Evolved UTRA and UTRAN (also referred to as Long Term Evolution or Super 3G) in the cell 2000 when the ratio of the mobile stations whose average transmission data rates avrgRn have been initialized is equal to or more than 20% of the entire mobile stations performing communications using the Evolved UTRA and UTRAN (also referred to as Long Term Evolution or Super 3G) in the cell 2000. The entire mobile stations performing communications using the Evolved UTRA and UTRAN (also referred to as Long Term Evolution or Super 3G) in the cell 2000 can be all mobile stations in the state in which data is accumulated in the priority queue, or the mobile stations in the state in which the connection is set with the radio base station 400.

In the above-mentioned two examples, it is judged whether or not the mobile station 41 can newly start communications using the Evolved UTRA and UTRAN (also referred to as Long Term Evolution or Super 3G) in the cell 2000 based on the number of mobile stations whose average transmission data rates avrgRn have been initialized, or it is judged whether or not the mobile station 41 can newly start communications using the Evolved UTRA and UTRAN (also referred to as Long Term Evolution or Super 3G) in the cell 2000 based on the ratio of mobile stations whose average transmission data rates avrgRn have been initialized. However, it is also possible to judge whether or not the mobile station 41 can newly start communications using the Evolved UTRA and UTRAN (also referred to as Long Term Evolution or Super 3G) in the cell 2000 based on both the number and the ratio of mobile stations whose average transmission data rates avrgRn have been initialized.

The number or the ratio of mobile stations whose average transmission data rates avrgRn have been initialized refers, for example, to the number or the ratio of mobile stations whose average transmission data rates avrgRn have been initialized in a predetermined measurement time. For example, it refers to the number or ratio of the mobile stations whose average transmission data rates avrgRn have been initialized at least once in the past three minutes as viewed from the time point of the LTE call admission judge unit 500 performing the judgment. Otherwise, the mobile station whose average transmission data rate avrgRn has been initialized for the times equal to or more than a predetermined threshold value in a predetermined measurement time can be a mobile station whose average transmission data rate avrgRn has been initialized. For example, it refers to the number or ratio of the initialization of the average transmission data rate avrgRn for at least three times in the past three minutes as viewed from the time point of the LTE call admission judge unit 500 performing the judgment.

The judgment as to whether or not the mobile station 41 can newly start communications using the LTE in the cell 2000 can be performed for each Priority Class. In this case, the number or the ratio of the mobile stations whose average transmission data rates avrgRn have been initialized for each Priority Class is calculated, and the above-mentioned judgment is performed.

Otherwise, the above-mentioned judgment can be performed using the total number or ratio of the mobile stations whose average transmission data rates avrgRn have been initialized relating to a plurality of Priority Classes. In this case, the number or ratio of the mobile stations whose the average transmission data rates avrgRn have been initialized can be totalized by weighting it depending on the Priority Class. For example, when a high Priority Class and a low Priority Class coexist, the number or ratio of the mobile stations whose average transmission data rates avrgRn have been initialized can be multiplied by 1.0 for a mobile station of the high Priority Class, the number or ratio of the mobile stations whose average transmission data rates avrgRn have been initialized can be multiplied by 0.5 for a mobile station of the low Priority Class, and then the totalizing process can be performed. It is also possible that the number or ratio of the mobile stations whose average transmission data rates avrgRn have been initialized is multiplied by 0.0 for a mobile station of the low priority class, and then the totalizing process can be performed.

Otherwise, it can be judged whether or not the mobile station 41 can newly start communications using the Evolved UTRA and UTRAN (also referred to as Long Term Evolution or Super 3G) in the cell 2000 for each service type, contract type, terminal type, user, or cell. In this case, the number or ratio of the mobile stations whose average transmission data rates avrgRn have been initialized is calculated for each service type, contract type, terminal type, user, or cell, and the above-mentioned judgment is performed.

In the above-mentioned example, the judgment is performed using the number or ratio of the initialized mobile stations. However, when a mobile station has a plurality of priority queues, the judgment can be performed using the number or ratio of the priority queues of the initialized mobile stations. In this case, the process relating to the scheduling is also performed for each priority queue of a mobile station.

In the above-mentioned example, the LTE call admission judge unit 500 judges whether or not the mobiles station 41 can newly start communications using the Evolved UTRA and UTRAN (also referred to as Long Term Evolution or Super 3G) in the cell 2000 based on the number or ratio of the mobile stations whose average transmission data rates avrgRn have been initialized. It is also possible to more easily judge whether or not the mobile station 41 can newly start communications using the Evolved UTRA and UTRAN (also referred to as Long Term Evolution or Super 3G) in the cell 2000 based on the transmission data rate of the mobile station n. For example, the LTE call admission judge unit 500 can receive from the mobile station transmission data rate calculation unit 470 the transmission data rate avrgRn of each mobile station n, and judge whether or not the mobile station 41 can newly start communications using the Evolved UTRA and UTRAN (also referred to as Long Term Evolution or Super 3G) in the cell 2000 based on the transmission data rate avrgRn of each mobile station n. Practically, based on the number or ratio of the mobile stations whose transmission data rates avrgRn are less than a predetermined threshold value, it can be judged whether or not the mobile station 41 can newly start communications using the Evolved UTRA and UTRAN (also referred to as Long Term Evolution or Super 3G) in the cell 2000.

The new call setting unit 413 receives a judgment result as to whether or not the mobile station 41 can newly start communications using the Evolved UTRA and UTRAN (also referred to as Long Term Evolution or Super 3G) in the cell 2000 from the LTE call admission judge unit 500. When the judgment result indicates that the mobile station 41 can newly start communications using the Evolved UTRA and UTRAN (also referred to as Long Term Evolution or Super 3G) in the cell 2000, the new call setting unit 413 performs the process for the mobile station 41 starting communications using the Evolved UTRA and UTRAN (also referred to as Long Term Evolution or Super 3G) in the cell 2000. That is, it notifies the mobile station 41 of a control signal for start of the communications, and sets the communications. On the other hand, when the judgment result indicates that the mobile station 41 cannot newly start communications using the Evolved UTRA and UTRAN (also referred to as Long Term Evolution or Super 3G) in the cell 2000, the new call setting unit 413 does not perform the process for the mobile station 41 starting communications using the Evolved UTRA and UTRAN (also referred to as Long Term Evolution or Super 3G) in the cell 2000. In this case, for example, the new call setting unit 413 can notify the mobile station 41 of the information that the communications using the Evolved UTRA and UTRAN (also referred to as Long Term Evolution or Super 3G) cannot be performed instead of performing the process for starting communications using the Evolved UTRA and UTRAN (also referred to as Long Term Evolution or Super 3G). In this case, the communications to be started by the mobile station 41 refer to lost calls.

Next, the operation of call admission control according to the present invention is explained below by referring to the flowchart shown in FIG. 14. Since the call admission control according to the present invention is related to the scheduling operation, the explanation is also given about the scheduling operation by referring to FIG. 15.

(Call Admission Control)

Figure 14:
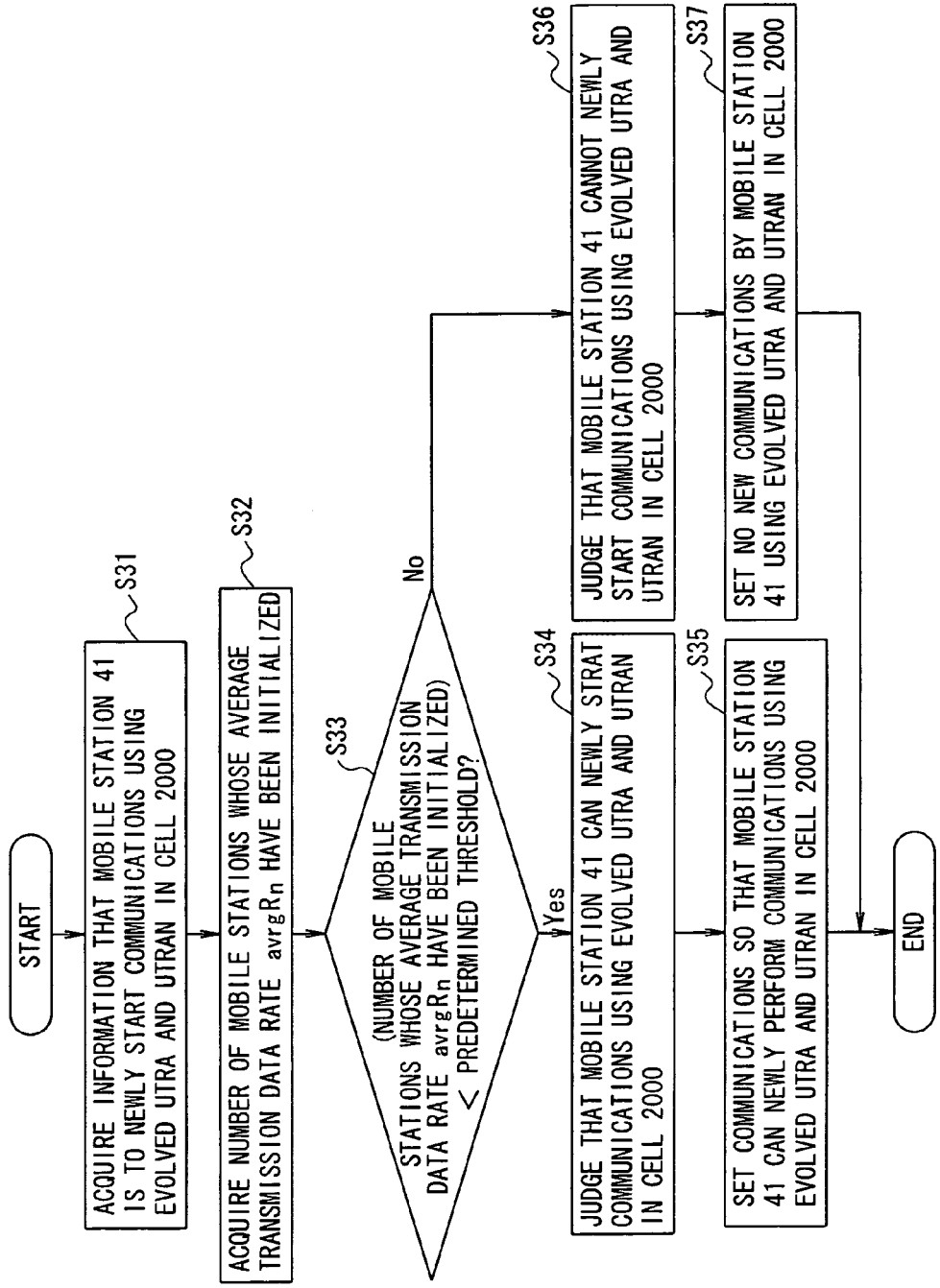
FIG. 14 is a flowchart showing the call admission judging operation of the MAC processing unit.

In FIG. 14, first in step S31, the LTE call admission judge unit 500 acquires the information that the mobile station 41 is to newly start the communications using the Evolved UTRA and UTRAN (also referred to as Long Term Evolution or Super 3G) in the cell 2000. In step S32, the LTE call admission judge unit 500 acquires the number of mobile stations whose average transmission data rates avrgRn have been initialized from the mobile station transmission data rate initialization unit 460.

In step S33, it is judged whether or not the number of mobile stations whose average transmission data rates avrgRn have been initialized is less than a predetermined threshold value, for example, 10. Then, if it is judged that the number of mobile stations whose average transmission data rates avrgRn have been initialized is less than a predetermined threshold value, control is passed to step S34. If it is judged that the number of mobile stations whose average transmission data rates avrgRn have been initialized is not less than a predetermined threshold value, then control is passed to step S36.

In step S34, the LTE call admission judge unit 500 judges that the mobile station 41 can newly start the communications using the Evolved UTRA and UTRAN (also referred to as Long Term Evolution or Super 3G) in the cell 2000.

In step S35, the new call setting unit 413 performs setting communications so that the mobile station 41 can newly start communications using the Evolved UTRA and UTRAN (also referred to as Long Term Evolution or Super 3G) in the cell 2000.

In step S36, the LTE call admission judge unit 500 judges that the mobile station 41 cannot newly start communications using the Evolved UTRA and UTRAN (also referred to as Long Term Evolution or Super 3G) in the cell 2000.

In step S37, the new call setting unit 413 judges that the mobile station 41 cannot newly start communications using the Evolved UTRA and UTRAN (also referred to as Long Term Evolution or Super 3G) in the cell 2000, and can perform the process of not performing settings of any communications. In this case, the communications to be performed by the mobile station 41 refer to lost calls.

In the steps S32 and S33 above, the number of mobile stations whose average transmission data rates avrgRn have been initialized is used as an index. However, the ratio of the number of the mobile stations whose average transmission data rates avrgRn have been initialized to the number of all mobile stations communicating in the cell 2000 can be used.

In the description above, the processes in steps S32 to S37 are performed with the timing of the mobile station 41 newly starting the communications using the Evolved UTRA and UTRAN (also referred to as Long Term Evolution or Super 3G) in the cell 2000, but the processes in steps S32 to S37 can also be performed at predetermined time intervals. For example, assuming 3 seconds as a judging period, the processes in steps S32 to S37 can be performed every 3 seconds. In this case, if it is judged that the communications can be newly started in the cell 2000, the new call setting unit 413 performs settings of the communications using the Evolved UTRA and UTRAN (also referred to as Long Term Evolution or Super 3G) on all mobile stations that are to start communications using the Evolved UTRA and UTRAN (also referred to as Long Term Evolution or Super 3G) in the cell 2000 in the next 3 seconds. If it is judged that the communications cannot be newly started in the cell 2000, the new call setting unit 413 performs the process of making no settings of any communications on all mobile stations that are to start communications using the Evolved UTRA and UTRAN (also referred to as Long Term Evolution or Super 3G) in the cell 2000 in the next 3 seconds.

(Scheduling Operation)

The scheduling operation relating to the call admission control according to the present invention is explained below by referring to FIG. 15.

Figure 15:
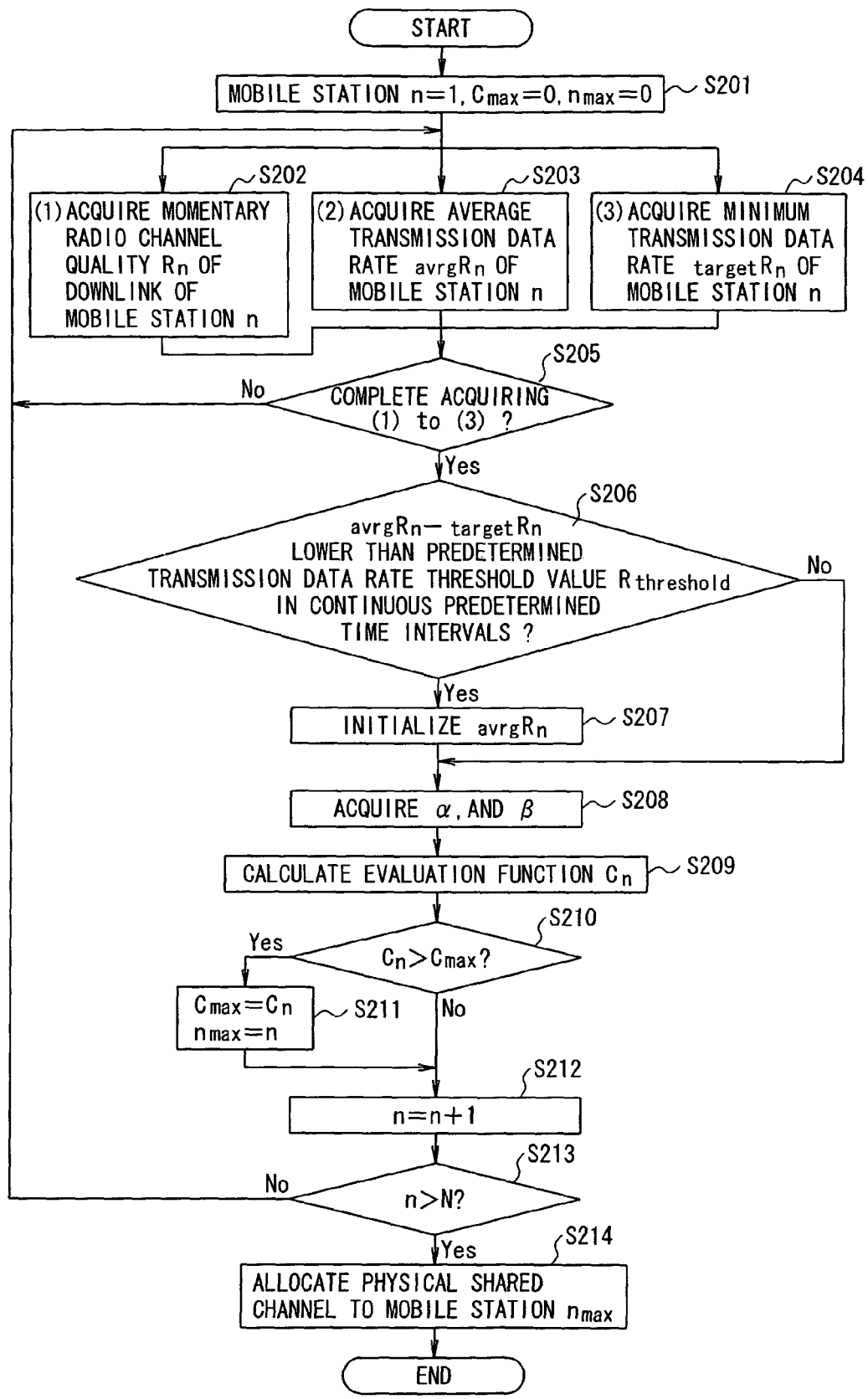
FIG. 15 is a flowchart showing an example of the scheduling operation of the MAC processing unit.

In FIG. 15, the evaluation function calculation unit 480 of the MAC processing unit 412 sets an initial value for calculating an evaluation function of the mobile station n in step S201.

(Setting Initial Value)

n=1

Cmax=0 nmax=0 where n indicates a subscript of a mobile station, Cmax indicates a maximum value of an evaluation function, and nmax indicates a subscript of a mobile station whose evaluation function is the maximum.

In step S202 to S204, the information about the following (1) to (3) for use in calculating the evaluation function Cn is acquired.

(1) Step S202: acquiring the downlink momentary radio channel quality of the mobile station n output from the layer 1 processing unit 411, or the size of data (amount of data) that can be estimated to be transmitted from the radio channel quality (the "the size of data that can be estimated to be transmitted from the radio channel quality" refers to the size of data estimated to be transmitted at a predetermined error rate from the CQI indicating the quality of downlink, or the momentary SIR of the downlink transmission channel, and the radio resource allocated to the PDSCH calculated by the MAC resource calculation unit)

(2) Step S203: acquiring the average transmission data rate avrgRn of the mobile station n output from the mobile station transmission data rate calculation unit 470

(3) Step S204: acquiring the minimum transmission data rate targetRn of the mobile station n output from the minimum transmission data rate setting unit 490

In step S205, it is judged whether or not all information in (1) to (3) above has been acquired. If it is judged that all information in (1) to (3) has been acquired (YES in step S205), control is passed to the next step. Otherwise (NO in step S205), the information not yet acquired in the information (1) to (3) above is acquired.

In step S206, it is judged whether or not the average transmission data rate avrgRn is to be initialized. For example, in the continuous predetermined time interval Timethreshold, if avrgRn−targetRn is less than a predetermined transmission data rate threshold value Rthreshold (YES in step S206), control is passed to step S207. Otherwise (NO in step S206), control is passed to step S208.

In step S207, since it is judged in step S206 that the average transmission data rate avrgRn is to be initialized, the average transmission data rate avrgRn is initialized.

In step S208, an index parameter ($\alpha$, $\beta$) remotely specified through the call processing unit 405 is received, and an evaluation function (Cn) is calculated by the following equation (4) in step S209.

When $(avrgRn-targetRn) > minusRn$, $Cn = Rn^{\alpha}/(avrgRn-targetRn)$

When $(avrgRn-targetRn) \leq minusRn$, $Cn = Rn^{\alpha}/minusRn^{\beta}$ \hfill (4)

Described below is the operation effect of initializing the average transmission data rate avrgRn in steps S206 and S207. When avrgRn−targetRn is close to "0", the value of the evaluation function Cn relating to the mobile station n increases. The operation is allocating on a priority basis a packet (PDSCH) to the mobile station n whose average transmission data rate has become lower than the minimum transmission data rate to be considered. Originally, it is a correct operation, but when there are a number of mobile stations whose average transmission data rates are lower than the minimum transmission data rate to be considered, more than necessary packets are allocated to the mobile stations, and packets are not allocated to other mobile stations, thereby degrading the throughput of the entire system. Thus, in a predetermined time interval Timethreshold, when the avrgRn−targetRn of the mobile A station n is lower than a predetermined transmission data rate threshold value Rthreshold, the degradation of the throughput of the entire system can be avoided by initializing the average transmission data rate avrgRn.

The number or ratio of the mobile stations whose average transmission data rates avrgRn are initialized can be used as an index indicating the congestion state of the cell. That is, when there are a number of mobile stations that cannot satisfy the minimum transmission data rate to be considered, it can be judged that the corresponding cell is in the congestion state. On the other hand, when there are no large number of mobile stations not capable of satisfying the minimum transmission data rate to be considered, it can be judged that the corresponding cell is not in the congestion state.

The predetermined time interval Timethreshold and the predetermined transmission data rate threshold value Rthreshold are remotely specified from, for example, the upper node (example: radio network controller and a server on a core network, etc.) of the radio base station 400. For example, it is noticed in a call processing control signal from an upper node to the radio base station 400. The radio base station 400 receives at the call processing unit 405 the predetermined time interval Timethreshold and the predetermined transmission data rate threshold value Rthreshold included in the call processing control signal, and transfers them to the evaluation function calculation unit 480 of the MAC processing unit 412 in the baseband signal processing unit 404. Otherwise, the predetermined time interval Timethreshold and the predetermined transmission data rate threshold value Rthreshold are held as internal data of the radio base station 400, and the evaluation function calculation unit 480 of the MAC processing unit 412 in the baseband signal processing unit 404 can refer to the predetermined time interval Timethreshold or the predetermined transmission data rate threshold value Rthreshold.

In addition, the present invention is not limited to the above-mentioned invention, but can be applied to a scheduler where a part of the equation of the evaluation function Cn is "$(avrgRn-targetRn)\beta$" For example, in the case of a scheduler having the following equation $Cn = Rn^{\alpha}/\exp((avrgRn-targetRn)\cdot\gamma)$ \hfill (9), the process of initializing the average transmission data rate avrgRn when the average transmission data rate avrgRn is lower than a predetermined transmission data rate threshold value Rthreshold in continuous predetermined time interval Timethreshold can be added according to the present invention. However, in the equation (9) above, $\alpha$ and $\gamma$ are parameter coefficients.

As described above, when the evaluation function Cn is calculated in step S209, it is judged (step S210) whether or not the calculated evaluation function Cn is the maximum value. In this example, since Cmax=0 is set (initial value), the evaluation function Cn measured in step S209 is set as Cmax, and the mobile station n provided by Cmax is set as the mobile station nmax (step S211).

In step S212, the mobile station n is incremented by +1 to calculate the evaluation function of the next mobile station. Unless it is judged that the mobile station n exceeds the number (m) of mobile stations communicating with the radio base station (NO in step S213), the loop process in and after step S202 is repeatedly performed until it is determined that it exceeds the number (m) of mobile stations. That is, the evaluation functions Cn of all mobile stations communicating with the radio base station are calculated. On the other hand, when it is determined in step S213 that the mobile station n exceeds the number (m) of mobile stations communicating with the radio base station (YES in step S213), the scheduler unit 440 is instructed to allocate a physical shared channel to the mobile station nmax set in step S211 (step S214).

According to the mode for embodying the present invention described above, in the scheduling of initializing the average transmission data rate avrgRn, by estimating the congestion state based on the number of mobile stations whose average transmission data rates avrgRn have been initialized, the call admission control can be performed regardless of the mode of a cell or the status of traffic.

The evaluation function calculation unit 480 of the MAC processing unit 412 is constituted by a programmable device capable of rewriting programs such as a CPU, a digital signal processor (DSP), an FPGA (Field Programmable Gate Array), etc., a program of the above-mentioned evaluation function is stored in a predetermined memory area, and a parameter ($\alpha$, $\delta$, Timethreshold, Rthreshold) is downloaded and rewritten. At this time, the parameter (α, δ, Timethreshold, Rthreshold) can be downloaded from the upper node of the radio base station, or the parameter (α, δ, Timethreshold, Rthreshold) can be directly read from the terminal by providing a terminal I/F (external interface function) for the evaluation function calculation unit 480.

Furthermore, each function block of the MAC processing unit 412 can be divided by hardware, or divided by a program on a processor as software.

In the operation of the call admission control relating to the above-mentioned present invention, based on the number or the ratio of the mobile stations whose average transmission data rates avrgRn have been initialized, it is judged whether or not the mobile station 41 can newly start communications using the Evolved UTRA and UTRAN (also referred to as Long Term Evolution or Super 3G) in the cell 2000. However, it is also possible to more easily judge based on the transmission data rate of each mobile station n whether or not the mobile station 41 can newly start communications using the Evolved UTRA and UTRAN (also referred to as Long Term Evolution or Super 3G) in the cell 2000. Based on the transmission data rate of each mobile station n, the operation of the call admission control when it is judged whether or not the mobile station 41 can newly start communications using the Evolved UTRA and UTRAN (also referred to as Long Term Evolution or Super 3G) in the cell 2000 is explained using the flowchart shown in FIG. 16.

In FIG. 16, first in step S51, the LTE call admission judge unit 500 acquires the information that the mobile station 41 is to newly start communications using the Evolved UTRA and UTRAN (also referred to as Long Term Evolution or Super 3G) in the cell 2000.

In step S52, the LTE call admission judge unit 500 acquires the average transmission data rate avrgRn of each mobile station n from the mobile station transmission data rate calculation unit 470, and the number of mobile stations whose average transmission data rates avrgRn are lower than a predetermined threshold value TH1. For example, the predetermined threshold value TH1 can be set as 64 kbps. Furthermore, for example, the number of mobile stations having the above-mentioned average transmission data rate avrgRn lower a predetermined threshold value TH1 in the continuous predetermined time interval Timethreshold can be acquired.

In step S53, it is judged whether or not the number of mobile stations having the above-mentioned average transmission data rate avrgRn lower a predetermined threshold value TH1 is lower than a predetermined threshold value TH2, for example, "10". When it is judged that the number of mobile stations having the above-mentioned average transmission data rate avrgRn lower a predetermined threshold value TH1 is lower than the threshold value TH2, control is passed to step S54. When it is judged that the number of mobile stations having the above-mentioned average transmission data rate avrgRn lower a predetermined threshold value TH1 is not lower than the threshold value TH2, control is passed to step S56.

In step S54, the LTE call admission judge unit 500 judges that the mobile station 41 can newly start communications using the Evolved UTRA and UTRAN (also referred to as Long Term Evolution or Super 3G) in the cell 2000.

In step S55, the new call setting unit 413 sets communications so that the mobile station 41 can newly perform communications using the Evolved UTRA and UTRAN (also referred to as Long Term Evolution or Super 3G) in the cell 2000.

In step S56, the LTE call admission judge unit 500 judges that the mobile station 41 cannot newly start communications using the Evolved UTRA and UTRAN (also referred to as Long Term Evolution or Super 3G) in the cell 2000.

In step S57, the new call setting unit 413 judges that the mobile 21 cannot newly perform communications in the cell 2000 and can perform the process of making no settings of any communications. In this case, the communications to be performed by the mobile station 41 refer to lost calls.

In steps S52 and S53, the number of mobile stations having the average transmission data rates avrgRn lower than a predetermined threshold value TH1 is used as an index, but the ratio of the number of mobile stations whose average transmission data rates avrgRn are lower than a predetermined threshold value TH1 to the number of all mobile stations communicating in the cell 2000 can be used.

In the description above, the processes in steps S52 to S57 are performed with the timing of the mobile station 41 newly starting the communications using the Evolved UTRA and UTRAN (also referred to as Long Term Evolution or Super 3G) in the cell 2000, but the processes in steps S52 to S57 can also be performed at predetermined time intervals. For example, assuming 3 seconds as a judging period, the processes in steps S52 to S57 can be performed every 3 seconds. In this case, if it is judged that the communications can be newly started in the cell 2000, the new call setting unit 413 performs settings of the communications using the Evolved UTRA and UTRAN (also referred to as Long Term Evolution or Super 3G) on all mobile stations that are to start communications using the Evolved UTRA and UTRAN (also referred to as Long Term Evolution or Super 3G) in the cell 2000 in the next 3 seconds. If it is judged that the communications cannot be newly started in the cell 2000, the new call setting unit 413 performs the process of making no settings of any communications on all mobile stations that are to start communications using the Evolved UTRA and UTRAN (also referred to as Long Term Evolution or Super 3G) in the cell 2000 in the next 3 seconds.

The above-mentioned embodiment is described relating to the downlink of the Evolved UTRA and UTRAN (also referred to as Long Term Evolution or Super 3G), but similar control can be performed on the uplink. In the above-mentioned embodiment, the function of the mobile station transmission data rate calculation unit 470 corresponds to the transmission data rate grasp means, the function of the minimum transmission data rate setting unit 490 corresponds to the minimum transmission data rate setting means, the function of the LTE call admission judge unit 500 corresponds to the judge means, and the function of the new call setting unit 413 corresponds to the new mobile station admission means.

In the above-mentioned embodiment, the radio base station 400 corresponds to the call admission control device, and the mobile stations (#1 to #3) 30 to 32 correspond to mobile stations.

Embodiment Mode 4

The mode 4 for embodying the present invention is explained below by referring to the attached drawings.

In the above-mentioned mode 3 for embodying the present invention, the LTE call admission judge unit 500 judges whether or not the mobile station 41 can newly start communications using the Evolved UTRA and UTRAN (also referred to as Long Term Evolution or Super 3G) in the cell 2000 based on the number or ratio of the initialized average transmission data rates avrgRn. However, the call admission judgment has the following problems. For example, assume that two mobile stations are performing communication in the corresponding cell, one of them is in an environment where the radio channel quality is extremely bad, and the average transmission data rate avrgRn has been initialized. In this case, assuming that the ratio of the initialization of the average transmission data rate avrgRn is 50%, and the threshold value is 30%, it is determined that the cell is in the congestion state although there are only two mobile stations in the cell.

In the mode 4 for embodying the present invention described below, to overcome the above-mentioned problems, the call admission judgment is performed using not only the number or ratio of the initialization of the average transmission data rates avrgRn, but also the number of all mobile stations communicating in the cell.

The configuration of the mobile communication system using the call admission control device according to the mode 4 for embodying the present invention is similar to the mode 3 for embodying the present invention, and only the difference is the function of the LTE call admission judge unit 500. Therefore, the description below relates to the function of the LTE call admission judge unit 500, and the others are omitted.

The LTE call admission judge unit 500 receives from the mobile station transmission data rate initialization unit 460 a judgment result as to whether or not the average transmission data rate avrgRn of the mobile station n has been initialized. Based on the number or the ratio of the mobile stations whose average transmission data rates avrgRn have been initialized, and the number of mobile stations communicating in the cell 2000, the LTE call admission judge unit 500 judges whether or not the mobile station 41 can newly start communications using the Evolved UTRA and UTRAN (also referred to as Long Term Evolution or Super 3G) in the cell 2000, and notifies the new call setting unit 413 in the call processing unit 405 of the judgment result.

Described below is the method of the LTE call admission judge unit 500 judging whether or not the mobile station 41 can newly start communications using the Evolved UTRA and UTRAN (also referred to as Long Term Evolution or Super 3G) in the cell 2000 based on the number or the ratio of the mobile stations whose average transmission data rates avrgRn have been initialized and, the number of mobile stations communicating in the cell 2000.

For example, the LTE call admission judge unit 500 can judge whether or not the mobile station 41 can newly start communications using the Evolved UTRA and UTRAN (also referred to as Long Term Evolution or Super 3G) in the cell 2000 based on the number of mobile stations whose average transmission data rates avrgRn have been initialized and the number of mobile stations communicating in the cell 2000. For example, when the number of mobile stations whose average transmission data rates avrgRn have been initialized is lower than "10", or the number of mobile stations communicating in the cell 2000 is lower than "20", it can be judged that the mobile station 41 can newly start communications using the Evolved UTRA and UTRAN (also referred to as Long Term Evolution or Super 3G) in the cell 2000. When the number of mobile stations whose average transmission data rates avrgRn have been initialized is equal to or higher than "10", and the number of mobile stations communicating in the cell 2000 is equal to or higher than "20", it can be judged that the mobile station 41 cannot newly start communications using the Evolved UTRA and UTRAN (also referred to as Long Term Evolution or Super 3G) in the cell 2000.

Additionally, for example, the LTE call admission judge unit 500 can judge whether or not the mobile station 41 can newly start communications using the Evolved UTRA and UTRAN (also referred to as Long Term Evolution or Super 3G) in the cell 2000 based on the ratio of mobile stations whose average transmission data rates avrgRn have been initialized and the number of mobile stations communicating in the cell 2000. For example, when the ratio of mobile stations whose average transmission data rates avrgRn have been initialized is lower than 20%, or the number of mobile stations communicating in the cell 2000 is lower than "20", it can be judged that the mobile station 41 can newly start communications using the Evolved UTRA and UTRAN (also referred to as Long Term Evolution or Super 3G) in the cell 2000. When the ratio of mobile stations whose average transmission data rates avrgRn have been initialized is equal to or higher than 20%, and the number of mobile stations communicating in the cell 2000 is equal to or higher than "20", it can be judged that the mobile station 41 cannot newly start communications using the Evolved UTRA and UTRAN (also referred to as Long Term Evolution or Super 3G) in the cell 2000.

Here the number of mobile stations communicating in the cell 2000 may be the number of mobile stations with data retained in priority queue or with connection set between it and the base station 400.

In the above-mentioned example, depending on whether or not the number of mobile stations communicating in the cell 2000 is equal to or higher than "20" as a fixed threshold value, it is judged whether or not the mobile station 41 can newly start communications using the Evolved UTRA and UTRAN (also referred to as Long Term Evolution or Super 3G) in the cell 2000. However, instead of a fixed threshold value, an adaptively fluctuating threshold value can be used. For example, since the number of mobile stations capable of communicating in a cell depends on the amount of power resources allocated to the PDSCH, the threshold value can be adaptively changed depending on the amount of power resources allocated to the PDSCH. That is, when the amount of power resources allocated to the PDSCH is 50% of the entire amount of power resources, the threshold value can be "20". When the amount of power resources allocated to the PDSCH is 25% of the entire amount of power resources, the threshold value can be "10". Otherwise, control can be similarly performed using the frequency resources (number of resource blocks), not power resources.

Next, the operation of the call admission control according to the mode 4 for embodying the present invention is explained by referring to the flowchart shown in FIG. 17. Since the scheduling operation relating to the call admission control according to the present invention is similar to the scheduling operation according to the mode for embodying the present invention, it is omitted here.

In FIG. 17, first in step S11, the LTE call admission judge unit 500 acquires the information that the mobile station 41 is to newly start communications using the Evolved UTRA and UTRAN (also referred to as Long Term Evolution or Super 3G) in the cell 2000.

In step S42, the LTE call admission judge unit 500 acquires from the mobile station transmission data rate initialization unit 460 the number of mobile stations whose average transmission data rates avrgRn have been initialized.

In step S43, it is judged whether or not the number of mobile stations whose average transmission data rates avrgRn have been initialized is lower than a predetermined threshold value TH1, for example, "10". If it is judged that the number of mobile stations whose average transmission data rates avrgRn have been initialized is lower than a predetermined threshold value TH1, control is passed to step S44. If it is judged that the number of mobile stations whose average transmission data rates avrgRn have been initialized is not lower than a predetermined threshold value TH1, control is passed to step S46.

In step S44, the LTE call admission judge unit 500 judges that the mobile station 41 can newly start communications using the Evolved UTRA and UTRAN (also referred to as Long Term Evolution or Super 3G) in the cell 2000.

In step S45, the new call setting unit 413 sets communications so that the mobile station 41 can newly perform communications in the cell 2000 using the Evolved UTRA and UTRAN (also referred to as Long Term Evolution or Super 3G).

In step S46, it is judged whether or not the number of mobile stations communicating in the cell 2000 is lower than a predetermined threshold value TH2, for example, "20". If it is judged that the number of mobile stations communicating in the cell 2000 is lower than a predetermined threshold value TH2, control is passed to step S44. If it is judged that the number of mobile stations communicating in the cell 2000 is not lower than a predetermined threshold value TH2, control is passed to step S47.

In step S47, the LTE call admission judge unit 500 judges that the mobile station 41 cannot newly start communications using the Evolved UTRA and UTRAN (also referred to as Long Term Evolution or Super 3G) in the cell 2000.

In step S48, the new call setting unit 413 judges that the mobile station 41 cannot newly perform communications in the cell 2000, and can perform the process of making no settings of any communications. In this case, the communications to be performed by the mobile station 41 are loss calls.

In the above-mentioned steps S42 and S43, the number of mobile stations whose average transmission data rates avrgRn have been initialized are used as indexes, but the ratio of the number of mobile stations whose average transmission data rates avrgRn have been initialized to the number of all mobile stations communicating in the cell 2000 can also be used.

In the description above, the processes in steps S42 to S48 are performed with the timing of the mobile station 41 newly starting the communications using the Evolved UTRA and UTRAN (also referred to as Long Term Evolution or Super 3G) in the cell 2000, but the processes in steps S42 to S48 can also be performed at predetermined time intervals. For example, assuming 3 seconds as a judging period, the processes in steps S42 to S48 can be performed every 3 seconds. In this case, if it is judged that the communications can be newly performed in the cell 2000, the new call setting unit 413 performs settings of the communications using the Evolved UTRA and UTRAN (also referred to as Long Term Evolution or Super 3G) on all mobile stations that are to start communications using the Evolved UTRA and UTRAN (also referred to as Long Term Evolution or Super 3G) in the cell 2000 in the next 3 seconds. If it is judged that the communications cannot be newly performed in the cell 2000, the new call setting unit 413 performs the process of making no settings of any communications on all mobile stations that are to start communications using the Evolved UTRA and UTRAN (also referred to as Long Term Evolution or Super 3G) in the cell 2000 in the next 3 seconds.

In the above-mentioned example, the LTE call admission judge unit 500 judges whether or not the mobile station 41 can newly start communications using the Evolved UTRA and UTRAN (also referred to as Long Term Evolution or Super 3G) in the cell 2000 based on the average number or ratio of the mobile stations whose average transmission data rates avrgRn have been initialized and the number or ratio of all mobile stations performing communications in the cell. It is also possible to more easily judge whether or not the mobile station 41 can newly start communications using the Evolved UTRA and UTRAN (also referred to as Long Term Evolution or Super 3G) in the cell 2000 based on the average transmission data rate of the mobile station n and the number or ratio of all mobile stations performing communications in the cell. For example, the LTE call admission judge unit 500 can receive from the mobile station transmission data rate calculation unit 470 the average transmission data rate avrgRn of each mobile station n, and judge whether or not the mobile station 41 can newly start communications using the Evolved UTRA and UTRAN (also referred to as Long Term Evolution or Super 3G) in the cell 2000 based on the transmission data rate avrgRn of each mobile station n and the number or ratio of all mobile stations performing communications in the cell. Practically, based on the number or ratio of the mobile stations whose average transmission data rates avrgRn are less than a predetermined threshold value and the number or ratio of all mobile stations performing communications in the cell, it can be judged whether or not the mobile station 41 can newly start communications using the Evolved UTRA and UTRAN (also referred to as Long Term Evolution or Super 3G) in the cell 2000.

(Call Admission Control Method)

In the above-mentioned call admission control device, the following call admission control method is used. That is, a call admission control method in a communication system for transmitting a packet to a plurality of mobile stations, which includes:

a transmission data rate grasp step (for example, corresponding to step S103 shown in FIG. 7) of measuring an average transmission data rate of the mobile station;

a minimum transmission data rate setting step (for example, corresponding to step S104 shown in FIG. 7) of setting a value of a minimum transmission data rate;

a judging step (for example, corresponding to step S106 shown in FIG. 7) of judging whether or not the value of the average transmission data rate of the mobile station is lower than the value of the minimum transmission data rate; and a new mobile station admission step (for example, corresponding to steps S23 to S25 shown in FIG. 8) of controlling admission of a new mobile station based on at least one of a number and a rate of mobile stations whose values of the average transmission data rates are lower than the value of the minimum transmission data rate is used. According to the call admission control method, by estimating the congestion status in a cell based on at least one of the number and the rate of the mobile stations whose values of the average transmission data rates are lower than the value of the minimum transmission data rate, and performing call admission control, the call admission control can be appropriately performed regardless of the manner in which traffic occurs or the mode of a cell.

The present invention can be applied to the call admission control of packet communications in the mobile communications.

What is claimed is:

1. A call admission control device in a communication system for transmitting a packet to a plurality of mobile stations, the device comprising:

transmission data rate grasp means for measuring an average transmission data rate of a plurality of mobile stations in communication;

minimum transmission data rate setting means for setting a value of a minimum transmission data rate;

judge means for judging whether or not a value of the average transmission data rate of the plurality of mobile stations in communication is lower than the value of the minimum transmission data rate; and new mobile station admission means for controlling a call of a new mobile station not to admit, in at least one of cases where:
   a number of the plurality of mobile stations in communication in which the average transmission data rate has been judged to be lower than the minimum transmission data rate;
   a ratio of the number of the plurality of mobile stations in communication in which the average transmission data rate has been judged to be lower than the minimum transmission data rate; and
   the ratio of the number of the plurality of mobile stations in communication is higher than a predetermined threshold value, and at least one of the number and the ratio of the mobile stations in communication is higher than another predetermined threshold value.

2. A call admission control device in a communication system for transmitting a packet to a plurality of mobile stations, the device comprising:
   transmission data rate grasp means for measuring an average transmission data rate of a plurality of mobile stations in communication;
   minimum transmission data rate setting means for setting a value of a minimum transmission data rate;
   average transmission data rate initialization means for initializing the value of the average transmission data rate of the plurality of mobile stations in communication by use of a downlink momentary radio channel quality reported from the plurality of mobile stations in communication or a transmittable size of data that can be estimated based on the radio channel quality, when the value of the average transmission data rate of the plurality of mobile stations in communication measured by the transmission data rate grasp means is lower than the value of the minimum transmission data rate set by the minimum transmission data rate setting means; and
   new mobile station admission means for controlling admission of a new mobile station based on at least one of a number and a ratio of the plurality of mobile stations in communication in which the value of the average transmission data rate has been initialized.

3. A call admission control device in a communication system for transmitting a packet to a plurality of mobile stations n, where n is a subscript to the mobile stations, the device comprising:
   status grasp means for grasping a radio channel quality $Rn$ of the plurality of mobile stations n and a transmission data rate avrgRn of the plurality of mobile stations n in communication;
   minimum transmission data rate setting means for setting a minimum transmission data rate $_{target}Rn$ and a transmission data rate threshold value $R_{threshold}$;
   transmission data rate initialization means for initializing the value of the transmission data rate avrgRn of the plurality of mobile stations in communication by use of a downlink momentary radio channel quality reported from the plurality of mobile stations in communication or a transmittable size of data that can be estimated based on the radio channel quality, when a value obtained by subtracting the minimum transmission data rate $_{target}Rn$ from the transmission data rate avrgRn grasped by the status grasp means is lower than the minimum transmission data rate threshold value $R_{threshold}$ set by the minimum transmission data rate setting means;
   setting means for setting an exponent α for exponentiating the radio channel quality $Rn$ and an exponent β for exponentiating the value obtained by subtracting the minimum transmission data rate $_{target}Rn$ from the transmission data rate avrgRn;
   evaluation function calculation means for calculating an evaluation function Cn for each of the plurality of mobile stations n by $Cn = Rn^{\alpha}/(avrgRn - _{target}Rn)^{\beta}$;
   mobile station selection means for selecting a mobile station having the maximum evaluation function Cn as a destination mobile station; and
   new mobile station admission means for controlling admission of a new mobile station based on at least one of a number and a ratio of the plurality of mobile stations n in communication in which the value of the transmission data rate avrgRn has been initialized.

4. The call admission control device according to claim 3, wherein the transmission data rate initialization means initializes the value of the transmission data rate avrgRn when the value obtained by subtracting the minimum transmission data rate $_{target}Rn$ from the transmission data rate avrgRn is lower than the transmission data rate threshold value $R_{threshold}$ at predetermined continuous time intervals.

5. The call admission control device according to claim 2 or 3, wherein the new mobile station admission means does not admit a call of a new mobile station when at least one of:
   the number of the plurality of mobile stations in communication in which the average transmission data rate has been judged to be lower than the minimum transmission data rate;
   the ratio of the number of the plurality of mobile stations in communication in which the average transmission data rate has been judged to be lower than the minimum transmission data rate;
   the number of the plurality of mobile stations in communication in which the value of the average transmission data rate has been initialized; and
   the ratio of the number of the plurality of mobile stations in communication in which the value of the average transmission data rate has been initialized;
   is higher than a predetermined threshold value.

6. The call admission control device according to claim 2 or 3, wherein the new mobile station admission means controls the admission of a new mobile station based on the number of the plurality of mobile stations in communication, in addition to at least one of:
   the number of the plurality of mobile stations in communication in which the average transmission data rate is has been judged to be lower than the minimum transmission data rate;
   the ratio of the number of the plurality of mobile stations in communication in which the average transmission data rate has been judged to be lower than the minimum transmission data rate;
   the number of the plurality of mobile stations in communication in which the value of the average transmission data rate has been initialized; and
   the ratio of the number of the plurality of mobile stations in communication in which the value of the average transmission data rate has been initialized.

7. The call admission control device according to claim 6, wherein the new mobile station admission means does not admit a call of a new mobile station, in at least one of cases where:
   the number of the plurality of mobile stations in communication in which the average transmission data rate has been judged to be lower than the minimum transmission data rate;

the ratio of the number of the plurality of mobile stations in communication in which the average transmission data rate has been judged to be lower than the minimum transmission data rate;

the number of the plurality of mobile stations in communication in which the value of the average transmission data rate has been initialized; and the ratio of the number of the plurality of mobile stations in communication is higher than a predetermined threshold value, and at least one of the number and the ratio of the mobile stations in communication is higher than another predetermined threshold value.

8. The call admission control device according to claim 2 or 3, wherein the new mobile station admission means performs a calculation depending on at least one of a service type, a contract type, a terminal type, a user identification, and a Priority Class when at least one of:

the number of the plurality of mobile stations in communication in which the value of the average transmission data rate has been judged to be lower than the minimum transmission data rate;

the ratio of the number of the plurality of mobile stations in communication in which the average transmission data rate has been judged to be lower than the minimum transmission data rate;

the number of the plurality of mobile stations in communication in which the value of the average transmission data rate has been initialized; and the ratio of the number of the plurality of mobile stations in communication in which the value of the average transmission data rate has been initialized;

is calculated.

9. The call admission control device according to any one of claims 1 to 3, where the communication system is a communication system to which HSDPA (High Speed Downlink Packet Access) is applied.

10. The call admission control device according to any one of claims 1 to 3, wherein:

the communication system is a communication system to which the Evolved UTRA and UTRAN, which is also referred to as Long Term Evolution or Super 3G, is applied.

11. A call admission control method in a communication system for transmitting a packet to a plurality of mobile stations, the method comprising:

measuring an average transmission data rate of a plurality of mobile stations in communication;

setting a value of a minimum transmission data rate;

judging whether or not the value of the average transmission data rate of the plurality of mobile stations in communication is lower than the value of the minimum transmission data rate; and controlling a call of a new mobile station not to admit, in at least one of cases where:

a number of the plurality of mobile stations in communication in which the average transmission data rate has been judged to be lower than the minimum transmission data rate;

a ratio of the number of the plurality of mobile stations in communication in which the average transmission data rate has been judged to be lower than the minimum transmission data rate; and the ratio of the number of the plurality of mobile stations in communication is higher than a predetermined threshold value, and at least one of the number and the ratio of the mobile stations in communication is higher than another predetermined threshold value.

12. The call admission control device according to claim 1, wherein the minimum transmission data rate setting means sets the value of the minimum transmission data rate for each of service type, contract type, terminal type, cell type, and priority class.

* * * * *